US012377422B2

(12) United States Patent
Tiong et al.

(10) Patent No.: US 12,377,422 B2
(45) Date of Patent: Aug. 5, 2025

(54) ELECTROSTATIC DUST REMOVAL APPARATUS AND ELECTRODE UNIT THEREOF

(71) Applicant: FREUDENBERG APOLLO FILTRATION TECHNOLOGIES CO., LTD., Guangdong (CN)

(72) Inventors: Jih Teck Tiong, Guangdong (CN); XiaoLe Wu, Guangdong (CN)

(73) Assignee: FREUDENBERG APOLLO FILTRATION TECHNOLOGIES CO., LTD., Foshan (CN)

( * ) Notice: Subject to any disclaimer, the term of this patent is extended or adjusted under 35 U.S.C. 154(b) by 818 days.

(21) Appl. No.: 17/651,608

(22) Filed: Feb. 18, 2022

(65) Prior Publication Data

US 2022/0168753 A1 Jun. 2, 2022

Related U.S. Application Data

(63) Continuation of application No. PCT/CN2020/109768, filed on Aug. 18, 2020.

(30) Foreign Application Priority Data

Aug. 19, 2019 (CN) ......................... 201910762346.8

(51) Int. Cl.
*B01D 53/02* (2006.01)
*B03C 3/04* (2006.01)
(Continued)

(52) U.S. Cl.
CPC .................. *B03C 3/70* (2013.01); *B03C 3/04* (2013.01); *B03C 3/64* (2013.01); *B03C 3/86* (2013.01)

(58) Field of Classification Search
CPC .... B03C 3/04; B03C 3/08; B03C 3/47; B03C 3/64; B03C 3/70; B03C 3/86
See application file for complete search history.

(56) References Cited

U.S. PATENT DOCUMENTS

2008/0250926 A1* 10/2008 Riskin ..................... B03C 3/363 96/60
2008/0315343 A1* 12/2008 Kitagawa ............. H10D 80/211 257/E29.01
(Continued)

FOREIGN PATENT DOCUMENTS

CN 203778200 8/2014
CN 204074260 1/2015
(Continued)

OTHER PUBLICATIONS

International Search Report from corresponding PCT Appln. No. PCT/CN2020/109768, mailed Nov. 29, 2020.
(Continued)

*Primary Examiner* — Christopher P Jones
(74) *Attorney, Agent, or Firm* — Grossman, Tucker, Perreault & Pfleger, PLLC

(57) ABSTRACT

An electrostatic dust removal apparatus and an electrode unit thereof are disclosed. The electrostatic dust removal apparatus includes a frame, and a plurality of electrode units. The plurality of electrode units include at least one high-potential unit and at least one low-potential unit. The plurality of electrode units are provided on the frame and are spaced apart from each other. The at least one high-potential unit and the at least one low-potential unit are arranged alternately, and an air channel for removing dust is formed between the electrode units adjacent to each other. Each of the plurality of electrode units includes a conducting part and an insulating part, the conducting part is a conductive plastic part and includes an electrical field generator and a
(Continued)

conducting end, and the insulating part covers at least a portion of the electrical field generator.

18 Claims, 17 Drawing Sheets

(51) Int. Cl.

| | |
|---|---|
| ***B03C 3/64*** | (2006.01) |
| ***B03C 3/70*** | (2006.01) |
| ***B03C 3/86*** | (2006.01) |

(56) References Cited

U.S. PATENT DOCUMENTS

| | | | | |
|---|---|---|---|---|
| 2018/0200729 | A1 | 7/2018 | Jameson et al. | |
| 2020/0139381 | A1 * | 5/2020 | Hu | B03C 3/12 |
| 2020/0238299 | A1 * | 7/2020 | Ran | B03C 3/86 |

FOREIGN PATENT DOCUMENTS

| | | | |
|---|---|---|---|
| CN | 105195326 | | 12/2015 |
| CN | 105363557 | | 3/2016 |
| CN | 105689135 | | 6/2016 |
| CN | 205701054 | | 11/2016 |
| CN | 206276499 | | 6/2017 |
| CN | 106925428 | | 7/2017 |
| CN | 207756285 | U | 8/2018 |
| CN | 208115989 | U | 11/2018 |
| CN | 110639701 | | 1/2020 |
| CN | 110639702 | | 1/2020 |
| CN | 110639703 | | 1/2020 |
| CN | 211865443 | U | 11/2020 |

OTHER PUBLICATIONS

First Office Action of CN Corresponding Application 201910762346.8 issued on Jun. 29, 2024 from the CNIPA. (7 Pages) (English Translation Attached).

Chinese Office Action with English translation issued Oct. 31, 2024, received in corresponding Chinese Patent Application No. 201910762346.8, 15 pages.

Decision of Refusal with English translation issued Jan. 16, 2025, received in corresponding Chinese Patent Application No. 201910762346.8, 15 pages.

* cited by examiner

ELECTROSTATIC DUST REMOVAL APPARATUS AND ELECTRODE UNIT THEREOF

CROSS REFERENCE OF RELATED APPLICATION

The present application is a continuation of International Application No. PCT/CN2020/109768 filed on Aug. 18, 2020, which claims the priority of the Chinese Patent Application No. 201910762346.8 filed by Freudenberg Apollo Filtration Technologies Co. Ltd. on Aug. 19, 2019, and entitled "ELECTROSTATIC DUST REMOVAL APPARATUS AND ELECTRODE UNIT THEREOF", the contents of both of which are incorporated herein by reference in its entirety.

TECHNICAL FIELD

The present disclosure relates to the field of air purification, and more particularly, to an electrostatic dust removal apparatus and an electrode unit thereof.

BACKGROUND

Electrostatic dust removal is one of methods for removing dust from one or more gases. The principle of the electrostatic dust removal method can be summarized as follows. When a gas and dust particles entrained in the gas pass through a high-voltage electrostatic field, the gas is electrically separated from the dust particles. The dust particles bond with negative ions and are charged negatively. Then the dust particles approach a surface of an anode and are deposited on the surface after discharging. That is, in a strong electric field, an air molecule is ionized into a positive ion and an electron, the electron may encounter the dust particle during approaching the anode, and thus the dust particle is charged negatively so as to be adsorbed onto the anode and then is collected on the anode.

In the related art, an electrostatic dust removal apparatus usually uses an electrode made of metal. Metal is not only costly, but also difficult to be machined and thus difficult to be processed into various shapes. In addition, corona discharge is liable to occur between a high-potential electrode and a low-potential electrode which are adjacent to each other, causing production of ozone and occurrence of an electric shock, which affect the use security. In order to solve the problem, in some electrostatic dust removal apparatuses, an additional insulator is provided between the adjacent electrodes, increasing the assembling complexity.

SUMMARY

The present disclosure aims to solve at least one of the technical problems in the prior art. To this end, one aim of the present disclosure is to provide an electrostatic dust removal apparatus, which has advantages such as lower manufacture cost, easiness to form various structures, high security and convenience for assembly.

The present disclosure also provides an electrode unit of an electrostatic dust removal apparatus.

In order to realize the above aims, according to embodiments in a first aspect of the present disclosure, an electrostatic dust removal apparatus is provided, including: a frame; and a plurality of electrode units including at least one high-potential unit and at least one low-potential unit. The plurality of electrode units are provided on the frame and are spaced apart from each other. The at least one high-potential unit and the at least one low-potential unit are arranged alternately, and an air channel for removing dust is formed between the electrode units adjacent to each other. Each of the plurality of electrode units includes a conducting part and an insulating part, the conducting part is a conductive plastic part and includes an electrical field generator and a conducting end, and the insulating part covers at least a portion of the electrical field generator.

The electrostatic dust removal apparatus according to embodiments of the present disclosure has advantages such as lower manufacture cost, easiness to form various structures, high security and convenience for assembly.

The electrostatic dust removal apparatus according to embodiments of the present disclosure may further include one or more of the following additional technical features.

According to some specific embodiments of the present disclosure, the insulating part covers the whole electrical field generator; or the electrical field generators adjacent to each other have surfaces facing each other, one of the surfaces is covered by the insulating part, and the other of the surfaces is exposed from the insulating part.

According to some specific embodiments of the present disclosure, the conducting part and the insulating part of each of the plurality of electrode units are formed integrally by injection molding.

According to some specific embodiments of the present disclosure, the conductive plastic has a tensile strength in the range of 20 MPa to 28 MPa, the conductive plastic has an ultimate elongation of not less than 10%, the conductive plastic has a flexural strength in the range of 32 MPa to 40 MPa, the conductive plastic has a flexural modulus in the range of 3000 MPa to 3800 MPa, and the conductive plastic has a notched impact strength in the range of 100 J/m to 140 J/m.

Further, the conductive plastic has a surface resistivity of $10^3$ Ohm-cm.

Further, the conductive plastic has a specific weight in the range of 0.92 g/cm$^3$ to 1.12 g/cm$^3$, the conductive plastic has flammability in HB class, the conductive plastic has shrinkage in the range of 0.4% to 0.8%, and the conductive plastic has heat deformation temperature in the range of 95° C. to 115° C.

Further, the conductive plastic is subject to a drying process in which drying temperature is in the range of 70° C. to 90° C.; and the conductive plastic is subject to the drying process in which drying time is in the range of 2 hours to 4 hours.

Further, the conductive plastic is subject to an injection molding in which melt temperature is in the range of 180° C. to 240° C.; the conductive plastic is subject to the injection molding in which front barrel temperature is in the range of 180° C. to 240° C.; the conductive plastic is subject to the injection molding in which middle barrel temperature is in the range of 180° C.-235° C.; the conductive plastic is subject to the injection molding in which rear barrel temperature is in the range of 180° C. to 230° C.; the conductive plastic is subject to the injection molding in which mold temperature is in the range of 50° C. to 80° C.

According to some specific embodiments of the present disclosure, the plurality of electrode units are arranged along the thickness direction of the plurality of electrode units, and two ends of each of the plurality of electrode units are detachably mounted onto two opposite sides of the frame respectively.

According to some specific embodiments of the present disclosure, one of the electrode units adjacent to each other is provided with a positioning ring, and the other of the electrode units adjacent to each other is provided with a positioning protrusion configured to be inserted into the positioning ring.

Further, an end positioning structure is provided on the frame, and the positioning ring or the positioning protrusion of the outermost electrode unit fits to the end positioning structure.

According to some specific embodiments of the present disclosure, the plurality of electrode units includes a plurality of high-potential units and a plurality of low-potential units. The electrostatic dust removal apparatus further includes: a high-potential conductor connected to the conducting end of each of the plurality of high-potential units; and a low-potential conductor connected to the conducting end of each of the plurality of low-potential units.

Further, one end of the high-potential unit is the conducting end formed by the conducting part of the high-potential unit, and the other end of the high-potential unit is the insulating end formed by the insulating part of the high-potential unit. One end of the low-potential unit is the conducting end formed by the conducting part of the low-potential unit, and the other end of the low-potential unit is the insulating end formed by the insulating part of the low-potential unit. The conducting ends of the plurality of high-potential units and the insulating ends of the plurality of low-potential units face one side of the frame, and the insulating ends of the plurality of high-potential units and the conducting ends of the plurality of low-potential units face an opposite side of the frame.

Further, the high-potential conductor is provided at the one side of the frame and is connected to the conducting end of each of the plurality of high-potential units and the insulating end of each of the plurality of low-potential units; and the low-potential conductor is provided at the opposite side of the frame and is connected to the conducting end of each of the plurality of low-potential units and the insulating end of each of the plurality of high-potential units.

According to some specific embodiments of the present disclosure, the electrostatic dust removal apparatus further includes: a first positioning element, the high-potential conductor being provided on the first positioning element, and the first positioning element fitting to the conducting end of each of the plurality of high-potential units and the insulating end of each of the plurality of low-potential units; and a second positioning element, the low-potential conductor being provided on the second positioning element, and the second positioning element fitting to the conducting end of each of the plurality of low-potential units and the insulating end of each of the plurality of high-potential units.

Further, the first positioning element is provided with a plurality of first positioning teeth, each of a plurality of first tooth spaces is formed between the first positioning teeth adjacent to each other, the high-potential conductor extends through the first positioning element and is exposed from the plurality of first tooth spaces, and each of the plurality of first positioning teeth is fitted between the conducting end of one high-potential unit and the insulating end of the low-potential unit adjacent to the one high-potential unit. The second positioning element is provided with a plurality of second positioning teeth, each of a plurality of second tooth spaces is formed between the second positioning teeth adjacent to each other, the low-potential conductor extends through the second positioning element and is exposed from the plurality of second tooth spaces, and each of the plurality of second positioning teeth is fitted between the conducting end of one low-potential unit and the insulating end of the high-potential unit adjacent to the one low-potential unit.

According to some specific embodiments of the present disclosure, the conducting end of each of the plurality of high-potential units and the insulating end of each of the plurality of low-potential units are provided with a first positioning groove respectively, and the first positioning element is fitted into a plurality of first positioning grooves. Further, the conducting end of each of the plurality of low-potential units and the insulating end of each of the plurality of high-potential units are provided with a second positioning groove respectively, and the second positioning element is fitted into a plurality of second positioning grooves.

According to some embodiments of the present disclosure, the first positioning element is provided with a plurality of first studs spaced apart from each other along its length direction, and the plurality of first studs are mounted on the frame by a plurality of first screw fasteners respectively. Further, the second positioning element is provided with a plurality of second studs spaced apart from each other along its length direction, and the plurality of second studs are mounted on the frame by a plurality of second screw fasteners respectively.

According to some specific embodiments of the present disclosure, the frame is provided with a plurality of first ribs which are spaced apart from each other and surround the first positioning element, and is provided with a plurality of second ribs which are spaced apart from each other and surround the second positioning element.

Further, the plurality of first ribs include a first linear rib and two first corner ribs, the first linear rib extends along the length direction of the first positioning element and presses against the inner side of the first positioning element, and the two first corner ribs press against at two corners at the outer side of the first positioning element respectively. Further, the plurality of second ribs include a second linear rib and two second corner ribs, the second linear rib extends along the length direction of the second positioning element and presses against the inner side of the second positioning element, and the two second corner ribs press against two corners at the outer side of the second positioning element respectively.

According to some specific embodiments of the present disclosure, the one side of the frame is provided with a first fixing element, the first fixing element is provided with a plurality of first fixing grooves spaced apart from each other along its length direction, and the conducting ends of the plurality of the high-potential units and the insulating ends of the plurality of the low-potential units are fitted into the plurality of first fixing grooves respectively. Further, the opposite side of the frame is provided with a second fixing element, the second fixing element is provided with a plurality of second fixing grooves spaced apart from each other along its length direction, and the conducting ends of the plurality of low-potential units and the insulating ends of the plurality of high-potential units are fitted into the plurality of second fixing grooves respectively.

According to some specific embodiments of the present disclosure, the frame is configured as a rectangle shape which surrounds the plurality of electrode units.

Further, each of the plurality of electrode units extends along the width direction of the frame, the plurality of electrode units are provided spaced apart from each other along the length direction of the frame, and two ends of each of the plurality of electrode units are detachably mounted onto two opposite sides of the frame in the width direction respectively.

Further, the electrostatic dust removal apparatus is bent into an arc shape about an axis, the axis extends along the length direction of the frame and is located at the middle of the frame in the width direction of the frame.

Further, the frame may include: a main frame; and a bottom frame detachably mounted onto the main frame, an installation space being defined between the bottom frame and the main frame, and both ends of each of the plurality of electrode units being provided in the installation space.

Further, one of the main frame and the bottom frame is provided with a male snap and the other of the main frame and the bottom frame is provided with a female snap, and the male snap is configured to be snapped onto the female snap.

Further, one of the main frame and the bottom frame is provided with a position-limiting pin and the other of the main frame and the bottom frame is provided with a position-limiting sleeve, and the position-limiting pin is configured to be inserted into the position-limiting sleeve.

According to embodiments in a second aspect of the present disclosure, an electrode unit of an electrostatic dust removal apparatus is proposed. The electrode unit of the electrostatic dust removal apparatus according to embodiments of the present disclosure includes: a conducting part, the conducting part being a conductive plastic part and including an electrical field generator and a conducting end; and an insulating part covering at least a portion of the electrical field generator.

The electrode unit of the electrostatic dust removal apparatus according to embodiments of the present disclosure has advantages such as lower manufacture cost, easiness to form various structures, high security and convenience for assembly.

Additional aspects and advantages of the present disclosure will be given at least in part in the following description, or become apparent partially from the following description, or can be learned from practicing of the present disclosure.

BRIEF DESCRIPTION OF DRAWINGS

The above and/or additional aspects and advantages of the present disclosure will become clear and easy to understand from the description of embodiments below in conjunction with the accompanying drawings, in which.

REFERENCE NUMERALS

Figure 1:
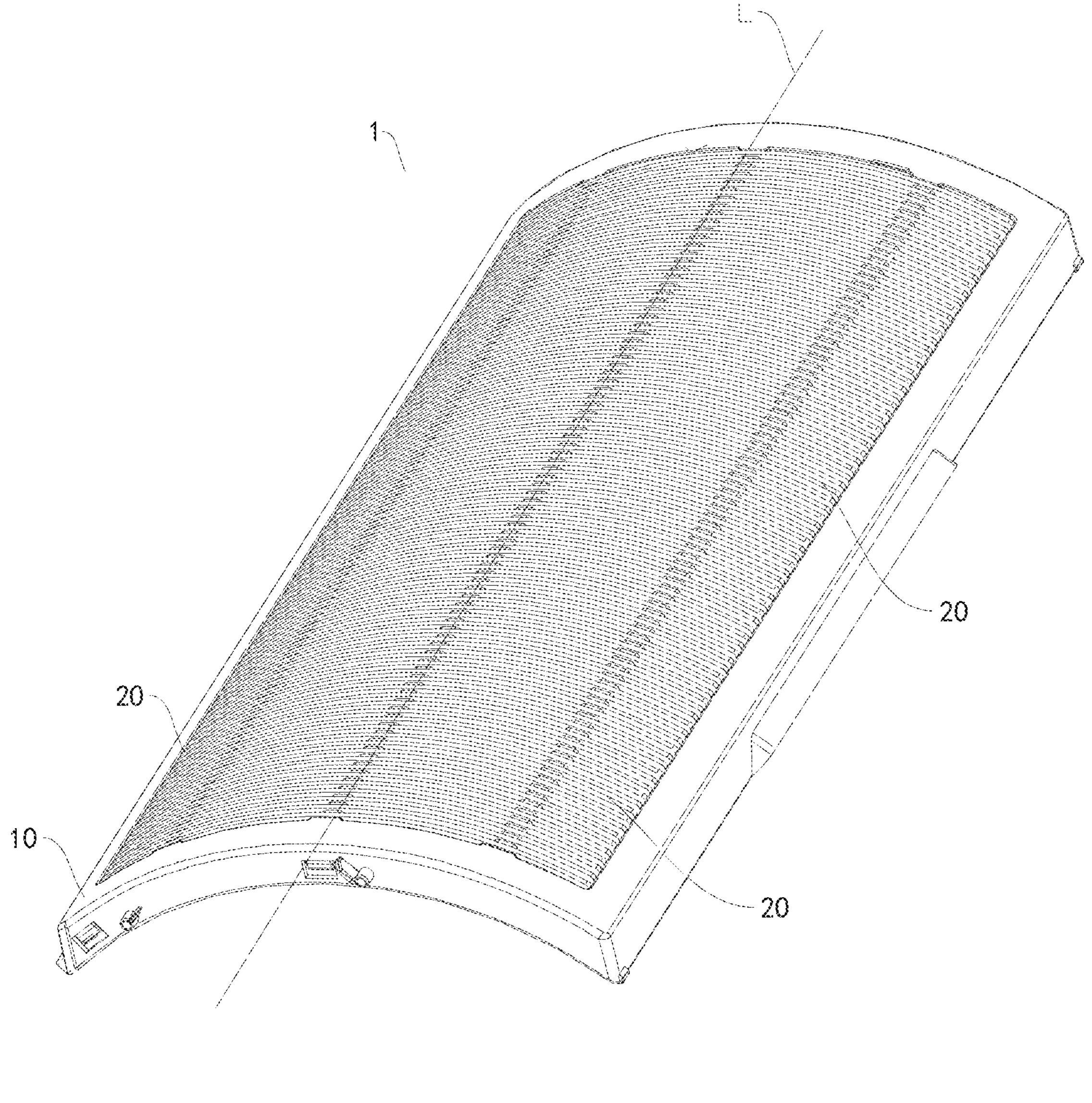
FIG. 1 is a schematic diagram showing a structure of an electrostatic dust removal apparatus according to an embodiment of the present disclosure.
Figure 2:
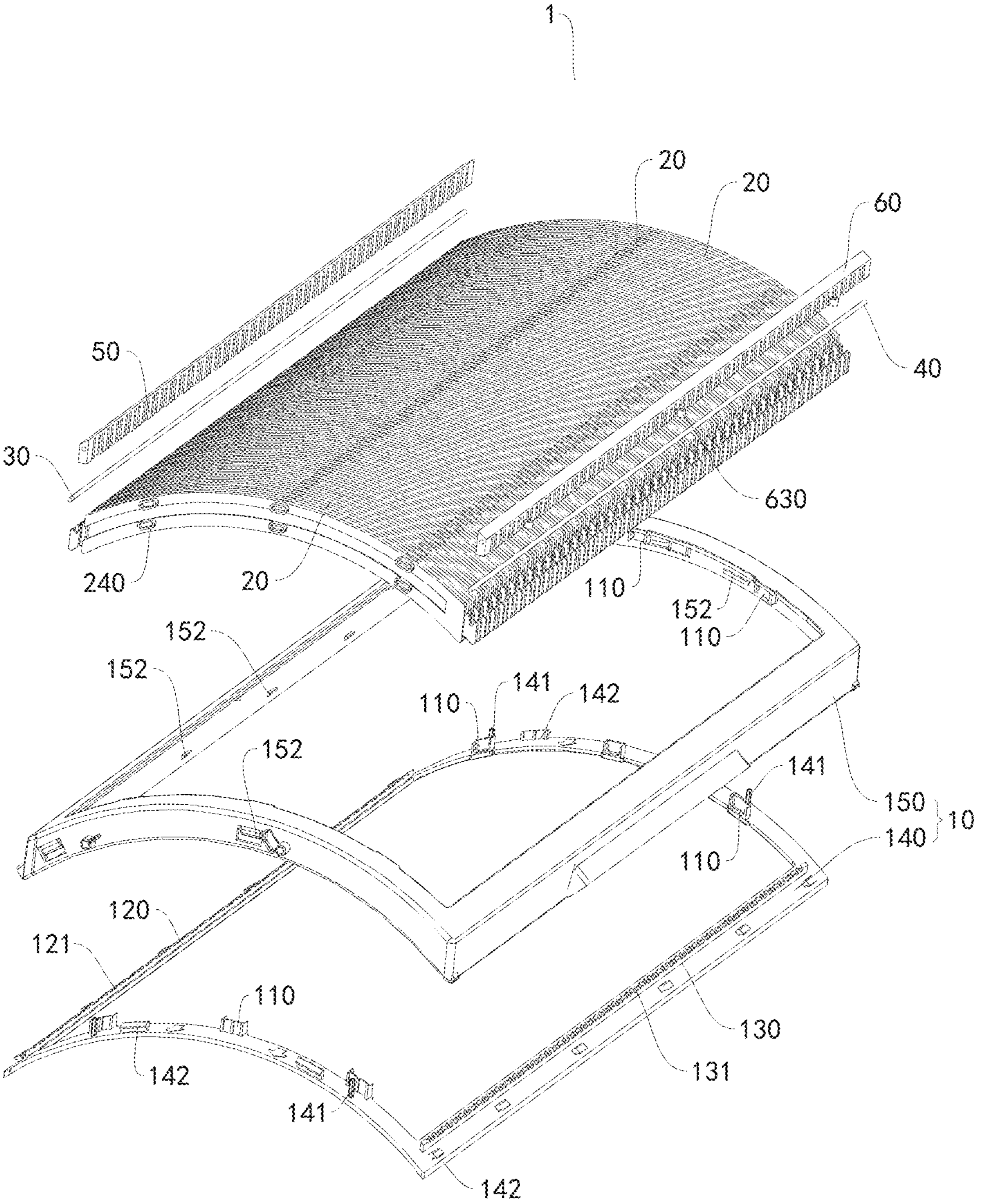
FIG. 2 is an exploded diagram showing an electrostatic dust removal apparatus according to an embodiment of the present disclosure.
Figure 3:
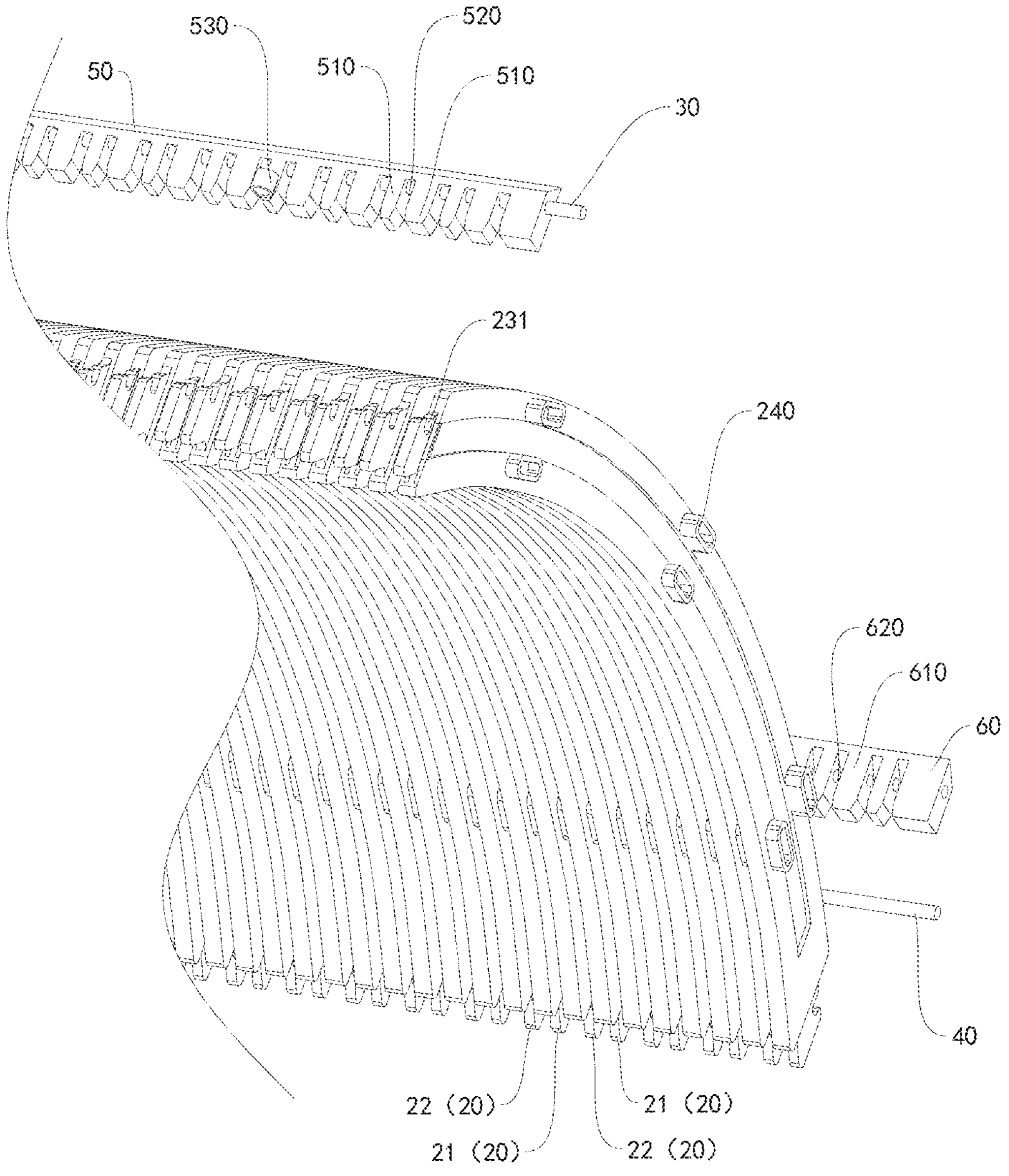
FIG. 3 is a schematic diagram showing connections among a plurality of electrode units and first and second positioning elements in an electrostatic dust removal apparatus according to an embodiment of the present disclosure.
Figure 4:
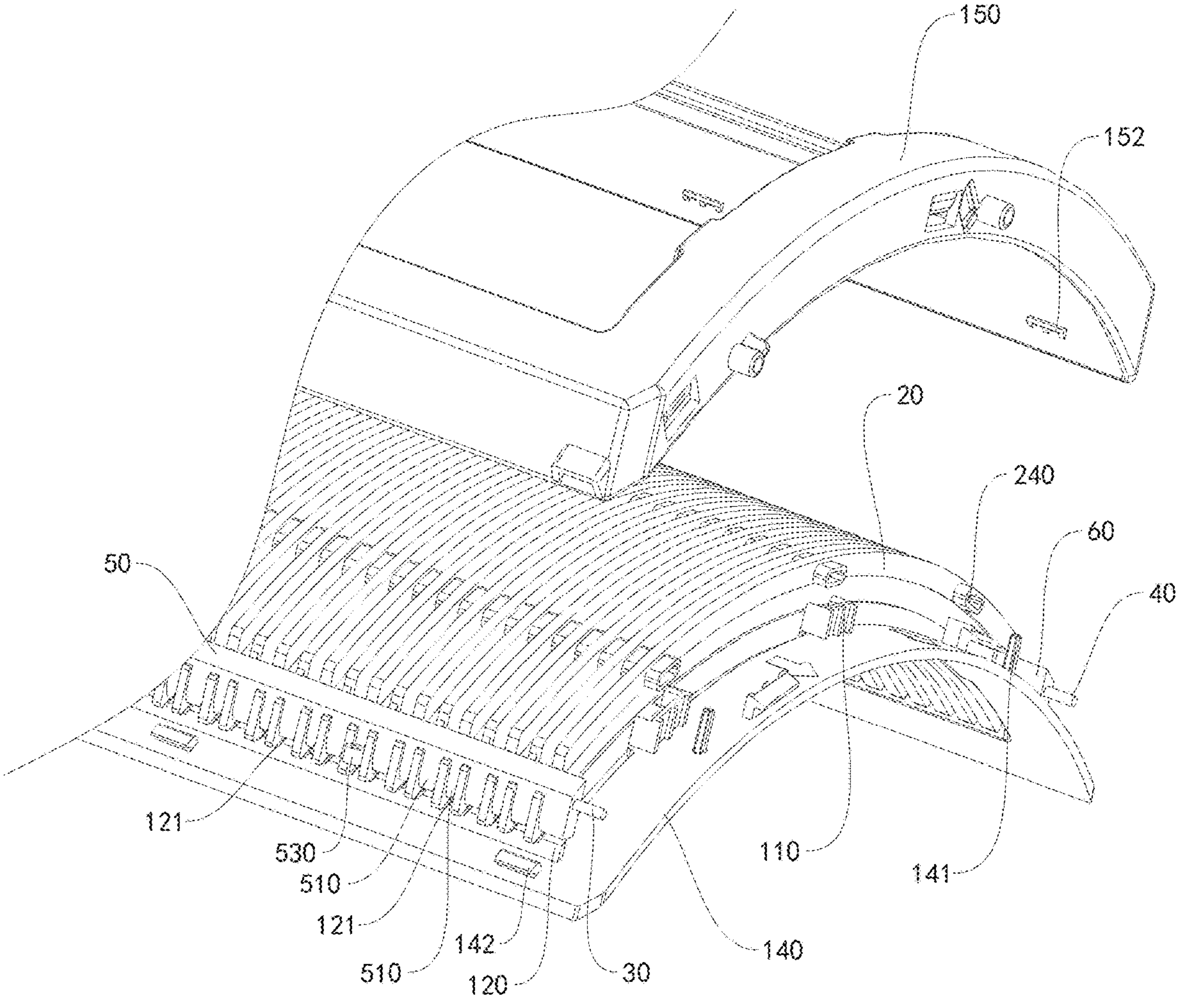
FIG. 4 is a schematic diagram showing the connection between a plurality of electrode units and a bottom frame in an electrostatic dust removal apparatus according to an embodiment of the present disclosure.
Figure 5:
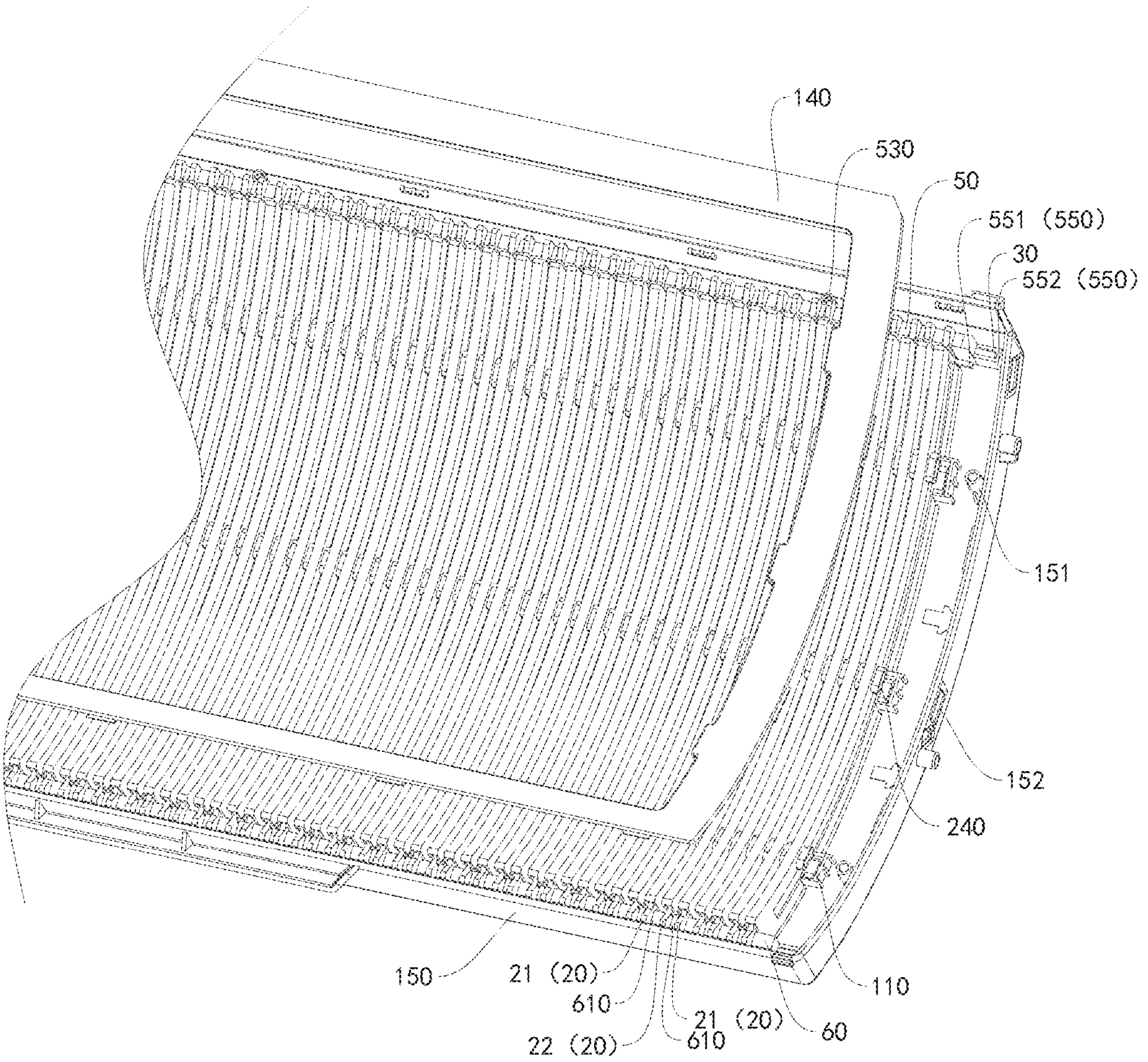
FIG. 5 is a schematic diagram showing the connection between a plurality of electrode units and a main frame in an electrostatic dust removal apparatus according to an embodiment of the present disclosure.

Electrostatic dust removal apparatus 1; Frame 10; End positioning structure 110; First fixing element 120; First fixing groove 121; Second fixing element 130; Second fixing groove 131; Main frame 150; Bottom frame 140; Position-limiting pin 141; Position-limiting sleeve 151; Male snap 142; Female snap 152; Electrode unit 20; high-potential unit 21; low-potential unit 22; Conducting part 210; Electrical field generator 211; Conducting end 212; Insulating part 220; Positioning protrusion 230; Positioning ring 240; Insulating end 221; High-potential conductor 30; Low-potential conductor 40; First positioning element 50; First positioning tooth 510; First tooth space 520; First stud 530; First rib 550; First linear rib 551; First corner rib 552; First positioning groove 231; Second positioning groove 232; Second positioning element 60; Second positioning tooth 610; Second tooth space 620; Second stud 630; axis L.

DESCRIPTION OF EMBODIMENTS

Embodiments of the present disclosure will be described in detail below with reference to examples thereof as illustrated in the accompanying drawings, throughout which same or similar elements, or elements having same or similar functions are denoted by same or similar reference numerals. The embodiments described below with reference to the drawings are illustrative only, and are only intended to explain, rather than limiting, the present disclosure.

In the description of the present disclosure, it shall be appreciated that, terms illustrating orientational or positional relations, such as "center", "upper", "lower", "front", "rear", "left", "right", "vertical", "horizontal", "top", "bottom", "inside" and "outside", are all on the basis of the orientational or positional relations illustrated in the drawings. Each of those terms is merely for the convenience and simplification of the description of the present disclosure, does not indicate or imply that the indicated device or component must be in a particular orientation or must be constructed and operated in a particular orientation, and therefore cannot be construed as limiting the present disclosure.

It shall be noted that, terms such as "first" and "second" are only illustrative, and cannot be construed as indicating or implying the degree of relative importance or the number of the technical features indicated. Therefore, features defined with "first" or "second" may implicitly or explicitly include one or more such features. Further, in the description of the present disclosure, "a plurality of" means two or more, unless otherwise specifically indicated.

An electrostatic dust removal apparatus 1 according to embodiments of the present disclosure will be described below with reference to the drawings.

As illustrated in FIG. 1 to FIG. 18, the electrostatic dust removal apparatus 1 according to the embodiments of the present disclosure includes a frame 10 and a plurality of electrode units 20.

The plurality of electrode units 20 are provided on the frame 10 and are spaced apart from each other. The plurality of electrode units 20 include at least one high-potential unit 21 and at least one low-potential unit 22, and the at least one high-potential unit 21 and the at least one low-potential unit 22 are arranged alternately. That is, one or more of the plurality of electrode units 20 may be formed as the high-potential unit(s) 21, and one or more of the plurality of electrode units 20 may be formed as the low-potential unit(s) 22. In other words, the electrode unit 20 adjacent to the high-potential unit 21 is used as the low-potential unit 22, and the electrode unit 20 adjacent to the low-potential unit 22 is used as the high-potential unit 21. For example, the plurality of electrode units 20 are arranged in an order of a high-potential unit 21, a low-potential unit 22, a high-potential unit 21, a low-potential unit 22 and so on. An air channel for removing dust is formed between the high-potential unit 21 and the low-potential unit 22 which are adjacent to each other. The air channel for removing dust extends along a length direction of the high-potential unit 21 and the low-potential unit 22 which are adjacent to each other.

Each of the plurality of electrode units 20 includes a conducting part 210 and an insulating part 220. The conducting part 210 is a conductive plastic part. The conducting part 210 includes an electrical field generator 211 and a conducting end 212. It shall be noted that, the electrical field generator 211 refers to a portion of the conducting part 210 that is configured to generate an electrical field, and the conducting end 212 refers to a portion of the conducting part 210 that is configured to realize an electrical connection. The insulating part 220 covers at least a portion of the electrical field generator 211. The conducting end 212 is exposed from the insulating part 220 for the electrical connection.

In the electrostatic dust removal apparatus 1 according to embodiments of the present disclosure, the conducting part 210 of the electrode unit 20 is made from conductive plastic. Compared with metal in the related art, the conductive plastic is easier and more flexible to machine, and can form various structures adapted for different application environments and structural demands of the electrostatic dust removal apparatus 1, and further the cost of the conductive plastic is lower. In the related art, conductive ink is used to form an electrode. However, it requires an additional process to apply the conductive ink, and it is difficult to guarantee the comprehensiveness and uniformity of the application. In the embodiments of the present disclosure, the use of the conductive plastic does not require any additional process, and the stability of the electrical field can be guaranteed.

At least a portion of the electrical field generator 211 of the conducting part 210 is covered by the insulating part 220, such that electrical field generators 211 adjacent to each other can be separated by at least one layer of insulating material. Therefore, on one hand, the corona discharge between adjacent electrode units 20 can be avoided, so as to reduce the generation of ozone and the risk of electric shock, greatly improving the use security. On the other hand, through the above covering, the conducting part 210 and the insulating part 220 can be formed as an integral part, simplifying the assembly. Further, each of the electrode units 20 can be formed as an individual component, facilitating replacement of an individual electrode unit 20 during the process of the manufacture and use. For example, during the process of manufacture, if it finds one or more defects in an individual electrode unit 20, the electrode unit 20 can be replaced independently without disposing of the plurality of electrode units 20 or the whole electrostatic dust removal apparatus, thereby indirectly improving the product yield and saving the manufacture cost. Further, during the process of use, an individual electrode unit 20 can be replaced, thereby making the repair and maintain during the process of use more convenient.

In addition, a long and narrow air channel for removing dust can be formed between adjacent electrode units 20, and can extend along the length direction of each of the adjacent electrode units 20. In this way, the wind resistance of the electrostatic dust removal apparatus 1 can be reduced so as to improve the dust removal efficiency.

In some specific embodiments of the present disclosure, the conductive plastic has a tensile strength in the range of 20 MPa to 28 MPa, an ultimate elongation of not less than 10%, a flexural strength in the range of 32 MPa to 40 MPa, a flexural modulus in the range of 3000 MPa to 3800 MPa, and a notched impact strength in the range of 100 J/m to 140 J/m. Preferably, the conductive plastic has a tensile strength of 24 MPa, a flexural strength of 36 MPa, a flexural modulus of 3400 MPa, and a notched impact strength of 120 J/m.

Further, the conductive plastic has a surface resistivity of $10^3$ Ohm-cm, a specific weight in the range of 0.92 g/cm$^3$ to 1.12 g/cm$^3$, flammability in HB class, a shrinkage in the range of 0.4% to 0.8%, and a heat deformation temperature in the range of 95° C. to 115° C. Preferably, the conductive plastic has a specific weight of 1.02 g/cm$^3$ and a heat deformation temperature of 105° C.

Further, the conductive plastic is subject to a drying process in which drying temperature is in the range of 70° C. to 90° C. and drying time is in the range of 2 hours to 4 hours. Preferably, the conductive plastic is subject to a drying process in which the drying temperature is 80° C.

Further, the conductive plastic is subject to an injection molding in which melt temperature is in the range of 180° C. to 240° C., front barrel temperature is in the range of 180° C. to 240° C., middle barrel temperature is in the range of 180° C. to 235° C., rear barrel temperature is in the range of 180° C.-230° C., mold temperature is in the range of 50° C. to 80° C. and injection pressure is medium pressure.

It can be obtained that, the conductive plastic has advantages such as good electrical conduction, good shape retention, light weight and high temperature resistance. Thus, in addition to the advantage of low manufacture cost, the electrode unit 20 made from the conductive plastic may have advantages such as lower risk of being damaged and high durability.

For example, the parameters of properties of the conductive plastic are given in the following table.

| Properties | Test Standard (Standard) | Test Condition (Condition) | Unit | Value |
|---|---|---|---|---|
| Mechanical Properties | | | | |
| Tensile Strength | ASTM D638 | 10 mm/min | MPa | 24 |
| Ultimate elongation | ASTM D638 | 10 mm/min | % | ≥10 |
| Flexural Strength (Tear strength) | ASTM D790 | 2 mm/min | MPa | 36 |
| Flexural Modulus | ASTM D790 | 2 mm/min | MPa | 3400 |
| IZOD Notched Impact Strength | ASTM D256 | 2.75 J | J/m | 120 |
| Electrical Properties | | | | |
| Surface Resistivity | ASTM D257 | / | Ohm-cm | $10^3$ |
| Others | | | | |
| Specific weight | ASTM D792 | 23° C. | g/cm$^3$ | 1.02 |
| Flammability | UL94 | 1.5 mm | Class | HB |
| Shrinkage (Mold Shrinkage) | ASTM D955 | 23° C. | % | 0.4-0.8 |
| Heat Deformation Temperature (HDT) | ASTM D1525 | 1.82 MPa | ° C. | 105 |
| Drying Process (Materials Drying Process) | | | | |
| Drying Temperature | | | ° C. | 80 |
| Drying Time | | | Hour | 2-4 |
| Injection Process | | | | |
| Melt Temperature | | | ° C. | 180-240 |
| Front Barrel Temperature (Cylinder Temperature) | | | ° C. | 180-240 |
| Middle Barrel Temperature (Cylinder Temperature) | | | ° C. | 180-235 |
| Rear Barrel Temperature (Cylinder Temperature) | | | ° C. | 180-230 |
| Mold Temperature | | | ° C. | 50-80 |
| Injection Pressure | | | | Medium |
| Injection Speed | | | | Medium |

In some specific embodiments of the present disclosure, as illustrated in FIG. 1 to FIG. 9, the electrical field generators 211 adjacent to each other have surfaces facing each other, one of the surfaces is covered by the insulating part 220 and the other of the surfaces is exposed from the insulating part 220, forming a semi-covered structure. In detail, one side surface of an electrical field generator 211 in its thickness direction and two opposite curved surfaces of the electrical field generator 211 in its width direction are covered by the insulating part 220. In two opposite side surfaces of two electrical field generators 211 adjacent to each other, one side surface is covered by its corresponding insulating part 220 so as to guarantee that the two adjacent electrical field generators 211 are separated by an insulating layer. In this way, the use security of the electrostatic dust removal apparatus 1 can be guaranteed cost-efficiently.

In other specific embodiments of the present disclosure, as illustrated in FIG. 10 to FIG. 18, the insulating part 220 covers the whole electrical field generator 211, forming a fully covered structure. In detail, two side surfaces of an electrical field generator 211 in its thickness direction, two opposite curved surfaces of the electrical field generator 211 in its width direction and the end of the electrical field generator 211 further away from the conducting end 212 are all covered by the insulating part 220. In this way, creepage between the electrical field generators 211 adjacent to each other can further be avoided, and the electric shock can be prevented so as to greatly improve the security. Further, the air breakdown can be eliminated, therefore the problem of ozone generation can be solved from the origin and the concentration of the generated ozone is quite low.

In some specific embodiments of the present disclosure, the conducting part 210 and the insulating part 220 of each of the plurality of electrode units 20 are formed integrally by injection molding. In the electrostatic dust removal apparatus 1 in the related art, for the purpose of improving the security, an additional insulator may be provided between the electrodes adjacent to each other. The manufacture and assembly of the additional insulator are independent from those of any of the electrodes. Therefore, the additional insulator and the electrode cannot formed as an integrated whole, and problems such as uncontrollability of thickness, difficulty in mass production, instability in structure and poor uniformity in spacing between the electrodes may occur.

In the electrostatic dust removal apparatus 1 according to embodiments of the present disclosure, the conducting part 210 and the insulating part 220 of the electrode unit 20 are formed integrally by injection molding, so that the conducting part 210 and the insulating part 220 are manufactured integrally to form an integrated whole. In this way, the assembly is simplified, and the structure is more stable. Further, a mold can be used, so as to guarantee a controllable uniformity of the thickness of the electrode units 20 and easiness for mass production. In addition, good uniformity in spacings among the electrodes can be guaranteed, thus the uniformity of the wind resistance in each position of the electrostatic dust removal apparatus 1 can be guaranteed so as to improve the dust removal uniformity.

In some specific embodiments of the present disclosure, as illustrated in FIG. 4 to FIG. 5 and FIG. 13 to FIG. 14, the plurality of electrode units 20 are arranged along the thickness direction of the plurality of electrode units 20, and two ends of each of the plurality of electrode units 20 are detachably mounted onto two opposite sides of the frame 10 respectively. In this way, the wind resistance can be lowered, the area for collecting dust can be increased, and the space usage of the electrostatic dust removal apparatus 1 can be reasonably set.

Further, as illustrated in FIG. 7 to FIG. 9 and FIG. 16 to FIG. 18, one of the electrode units 20 adjacent to each other is provided with a positioning ring 240, and the other of the electrode units 20 adjacent to each other is provided with a positioning protrusion 230 configured to be inserted into the positioning ring 240.

For example, each of the positioning protrusion 230 and the positioning ring 240 is formed by a corresponding insulating part 220. A plurality of positioning rings 240 are provided on one side surface of each of the plurality of the electrode unit 20 in the thickness direction of the electrode unit 20, the plurality of positioning rings 240 are divided into two rows along the width direction of the electrode unit 20, and each positioning ring 240 forms a groove by its annular shape. A plurality of positioning protrusions 230 are provided on the other side surface of each of the plurality of electrode units 20 in the thickness direction of the electrode unit 20, the plurality of positioning protrusions 230 are divided into two rows along the width direction of the electrode unit 20, and each of the positioning protrusions 230 is configured to be inserted into the groove of its corresponding positioning ring 240. The electrode units 20 adjacent to each other can be assembled together by the fitting of the respective positioning protrusions 230 to the respective positioning rings 240. In this way, the plurality of electrode units 20 can be fixed together so as to form an unified whole, and then can be assembled with the frame 10. Further, the provision of the positioning protrusions 230 and the positioning rings 240 can reliably define the spacings between the electrode units 20 adjacent to each other to guarantee the uniformity of the air channels for removing dust.

Figure 6:
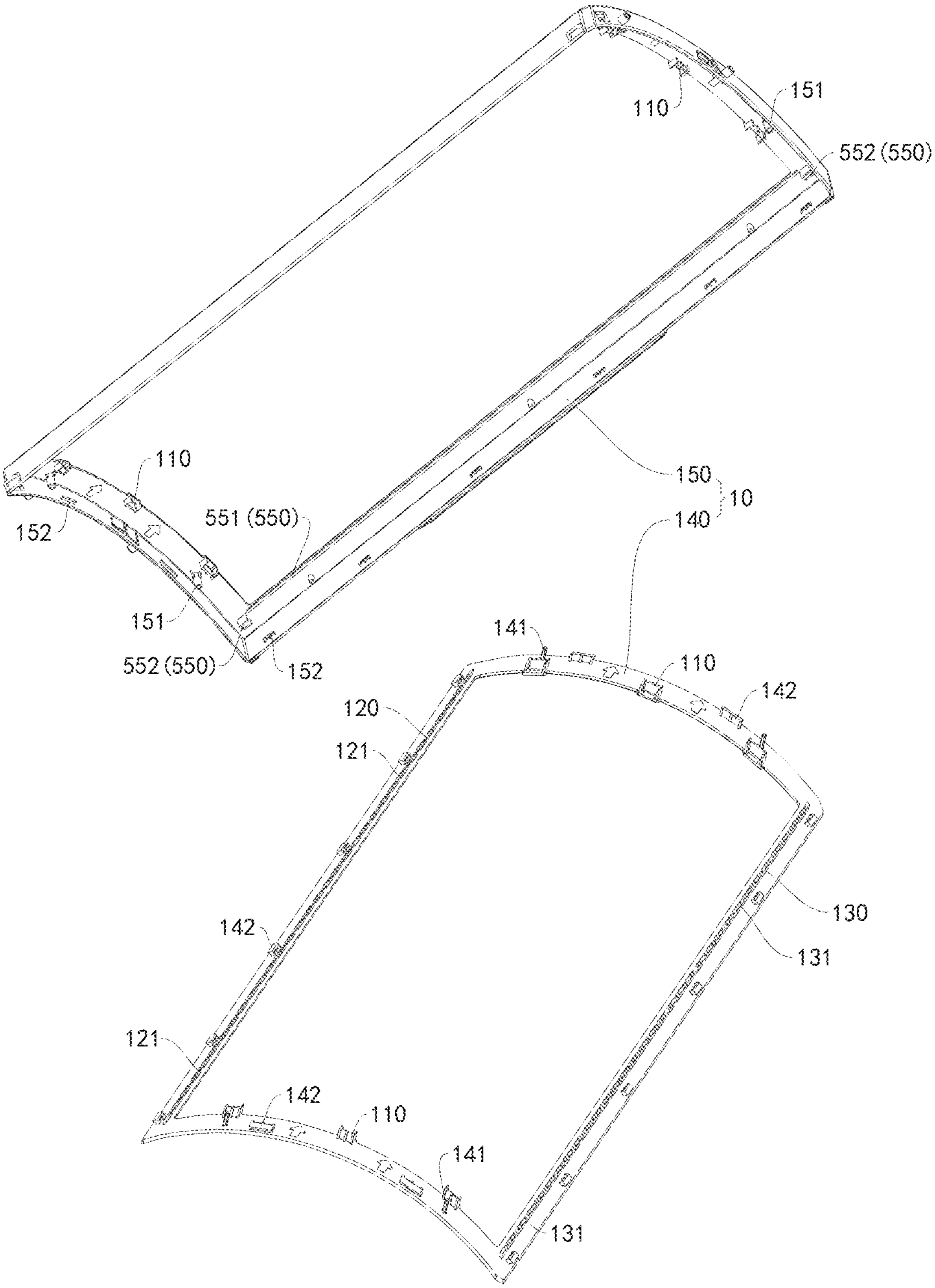
FIG. 6 is an exploded view of a frame of an electrostatic dust removal apparatus according to an embodiment of the present disclosure.
Figure 15:
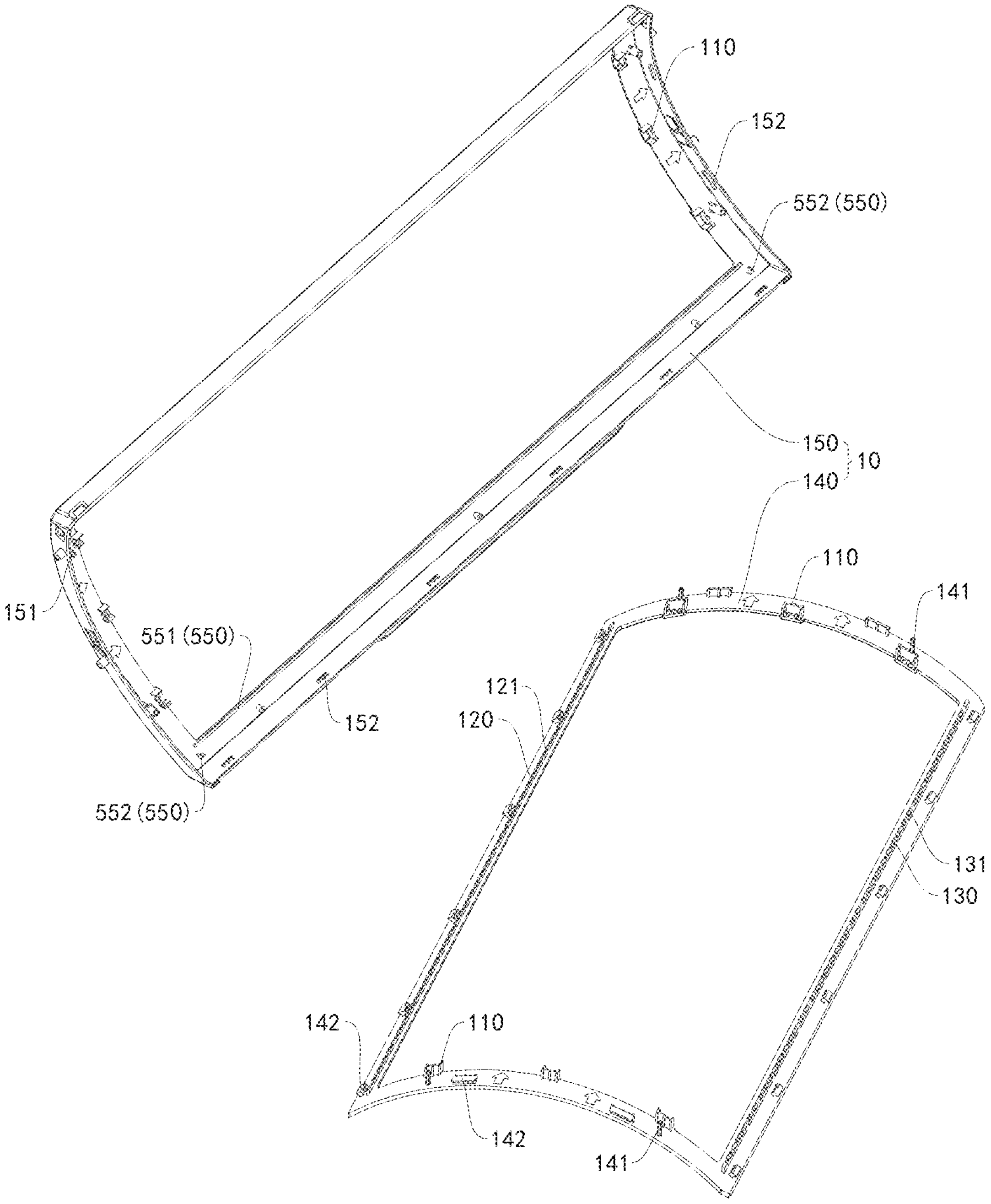
FIG. 15 is an exploded view of a frame of an electrostatic dust removal apparatus according to yet another embodiment of the present disclosure.

Further, as illustrated in FIG. 6 and FIG. 15, an end positioning structure 110 is provided on the frame 10. In the plurality of electrode units 20, the positioning ring 240 or the positioning protrusion 230 on the outermost electrode unit 20 fits to the end positioning structure 110. Here, the structure of the end positioning structure 110 is suitable to fit to either of the positioning ring 240 and the positioning protrusion 230. In practical applications, depending on the positioning ring 240 or the positioning protrusion 230 being provided on the electrode unit 20 adjacent to the end positioning structure 110, the end positioning structure 110 fits to the positioning ring 240 or the positioning protrusion 230.

For example, a plurality of end positioning structures 110 are provided on either of two opposite sides of the frame 10 in the length direction of the frame 10, and are arranged spaced apart from each other in the width direction of the frame 10. Each end positioning structure 110 has a notch in its surface which faces the inner side of the frame 10, and the positioning ring 240 or the positioning protrusion 230 can fit into the notch so as to fit to the end positioning structure 110. The above configuration can enhance the stability of the relative positions of the plurality of electrode units 20 and the frame 10, which can further improve the structural reliability of the electrostatic dust removal apparatus 1.

In some specific embodiments of the present disclosure, as illustrated in FIG. 2 to FIG. 3 and FIG. 11 to FIG. 12, there are a plurality of high-potential units 21 and a plurality of low-potential units 22. The electrostatic dust removal apparatus 1 further includes a high-potential conductor 30 and a low-potential conductor 40. The high-potential conductor 30 is connected to the conducting end 212 of each of the plurality of high-potential units 21, so as to cause the plurality of high-potential units 21 to conduct electricity in the same potential. The low-potential conductor 40 is connected to the conducting end 212 of each of the plurality of low-potential units 22, so as to cause the plurality of low-potential units 22 to conduct electricity in the same potential. The high-potential conductor 30 and the low-potential conductor 40 each can be cylindrical in shape.

Figure 7:
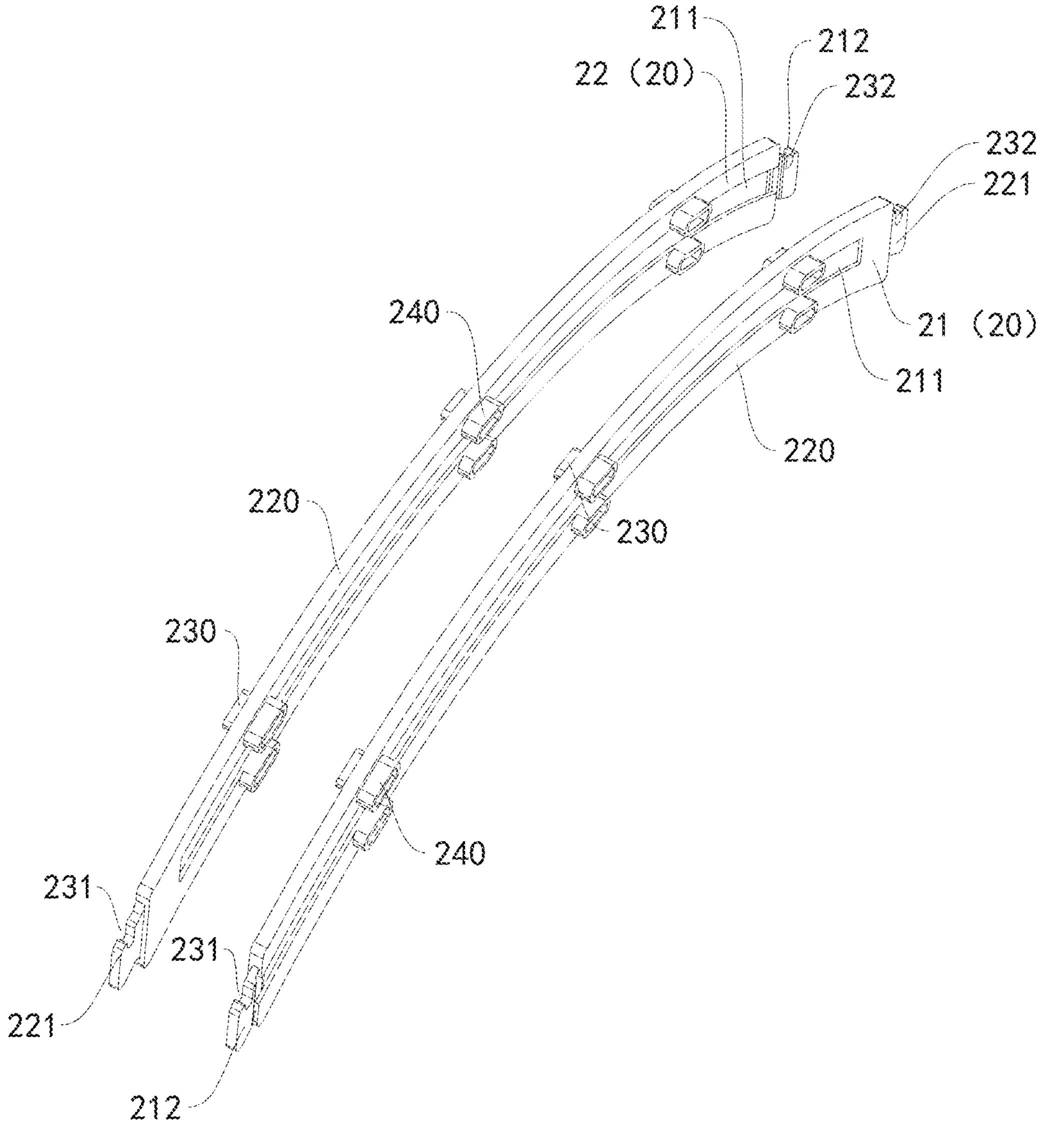
FIG. 7 is a schematic diagram showing a structure of one side of an electrode unit of an electrostatic dust removal apparatus according to an embodiment of the present disclosure.
Figure 8:
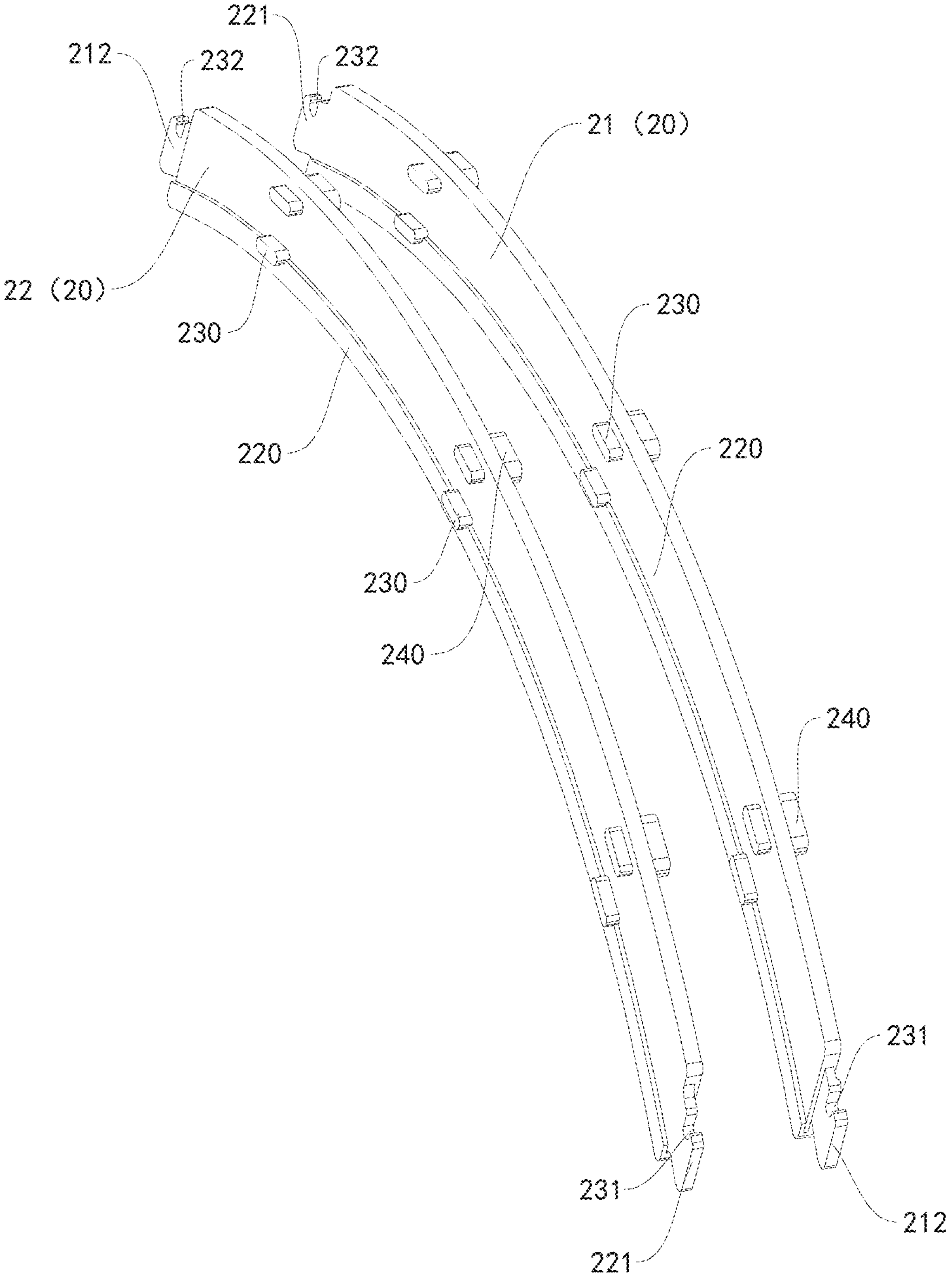
FIG. 8 is a schematic diagram showing a structure of a opposite side of an electrode unit of an electrostatic dust removal apparatus according to an embodiment of the present disclosure.
Figure 9:
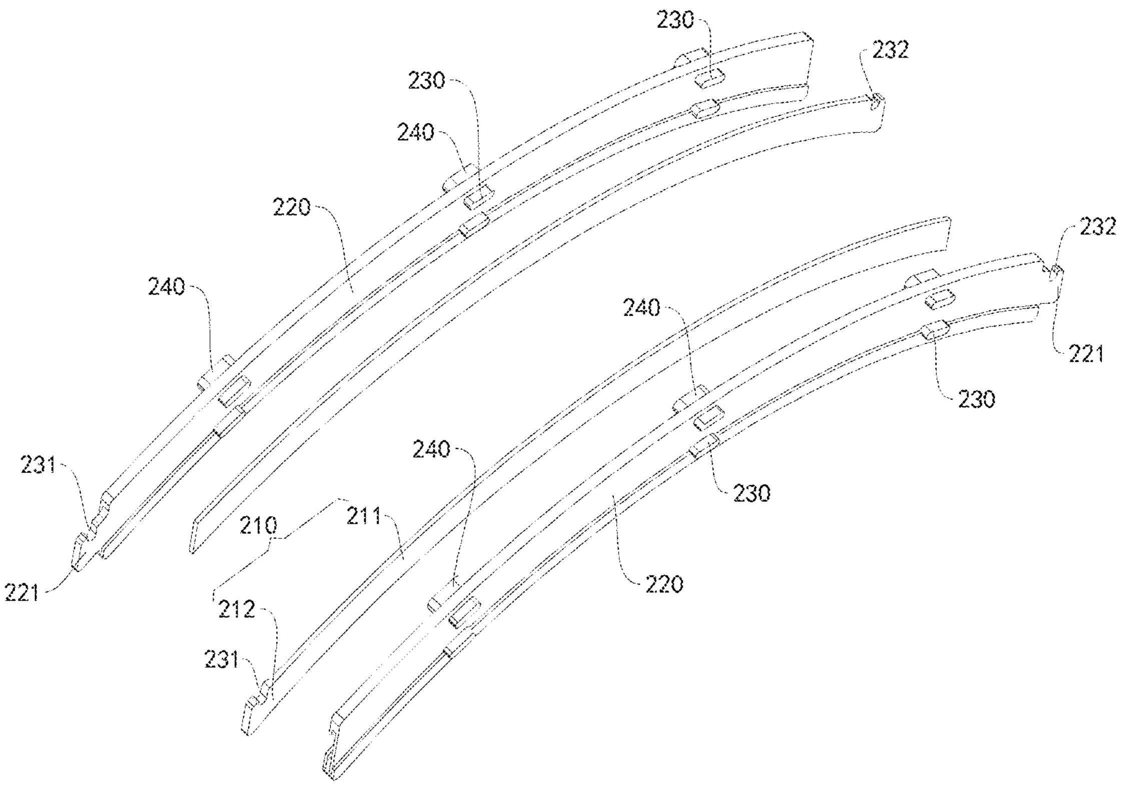
FIG. 9 is an exploded view of an electrode unit of an electrostatic dust removal apparatus according to an embodiment of the present disclosure.
Figure 10:
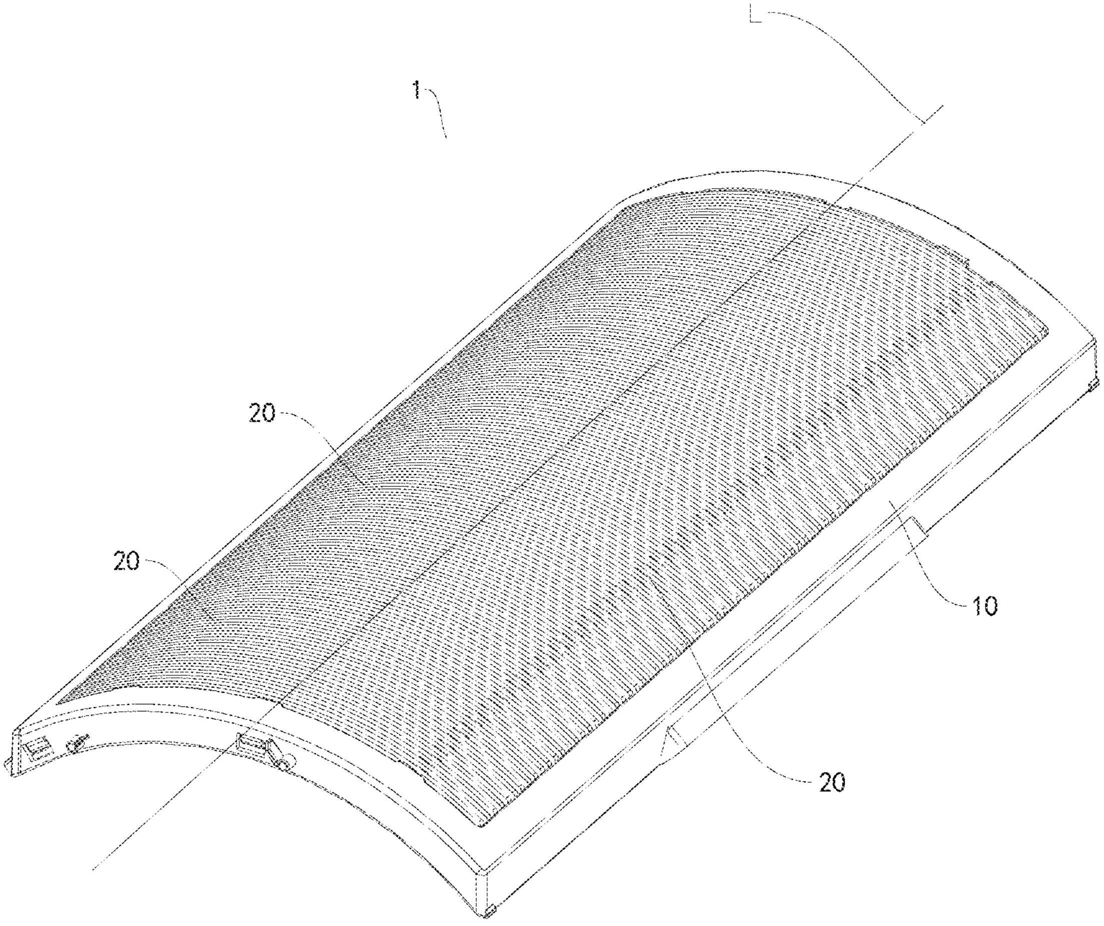
FIG. 10 is a schematic diagram showing a structure of an electrostatic dust removal apparatus according to another embodiment of the present disclosure.
Figure 11:
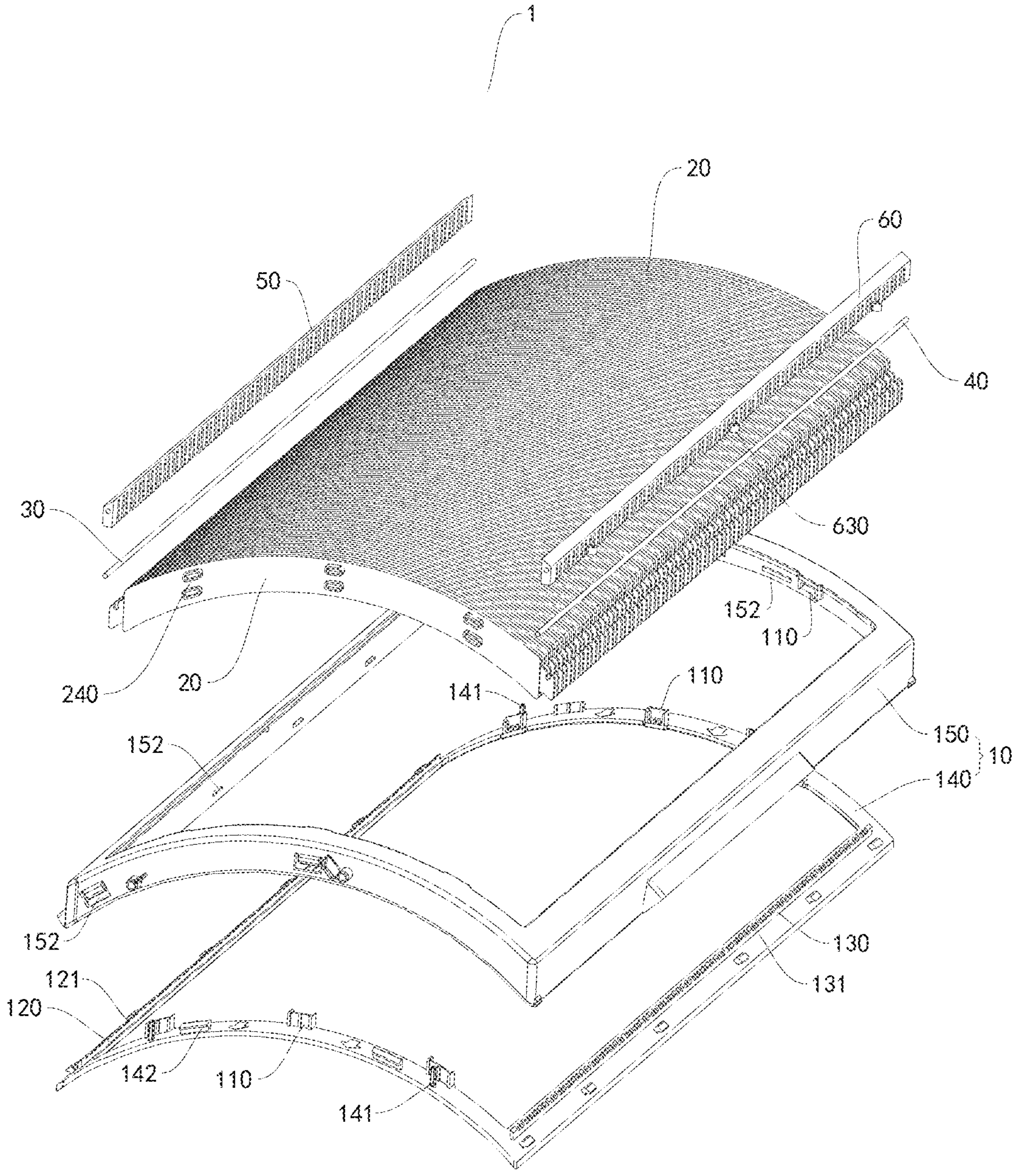
FIG. 11 is an exploded view of an electrostatic dust removal apparatus according to yet another embodiment of the present disclosure.
Figure 12:
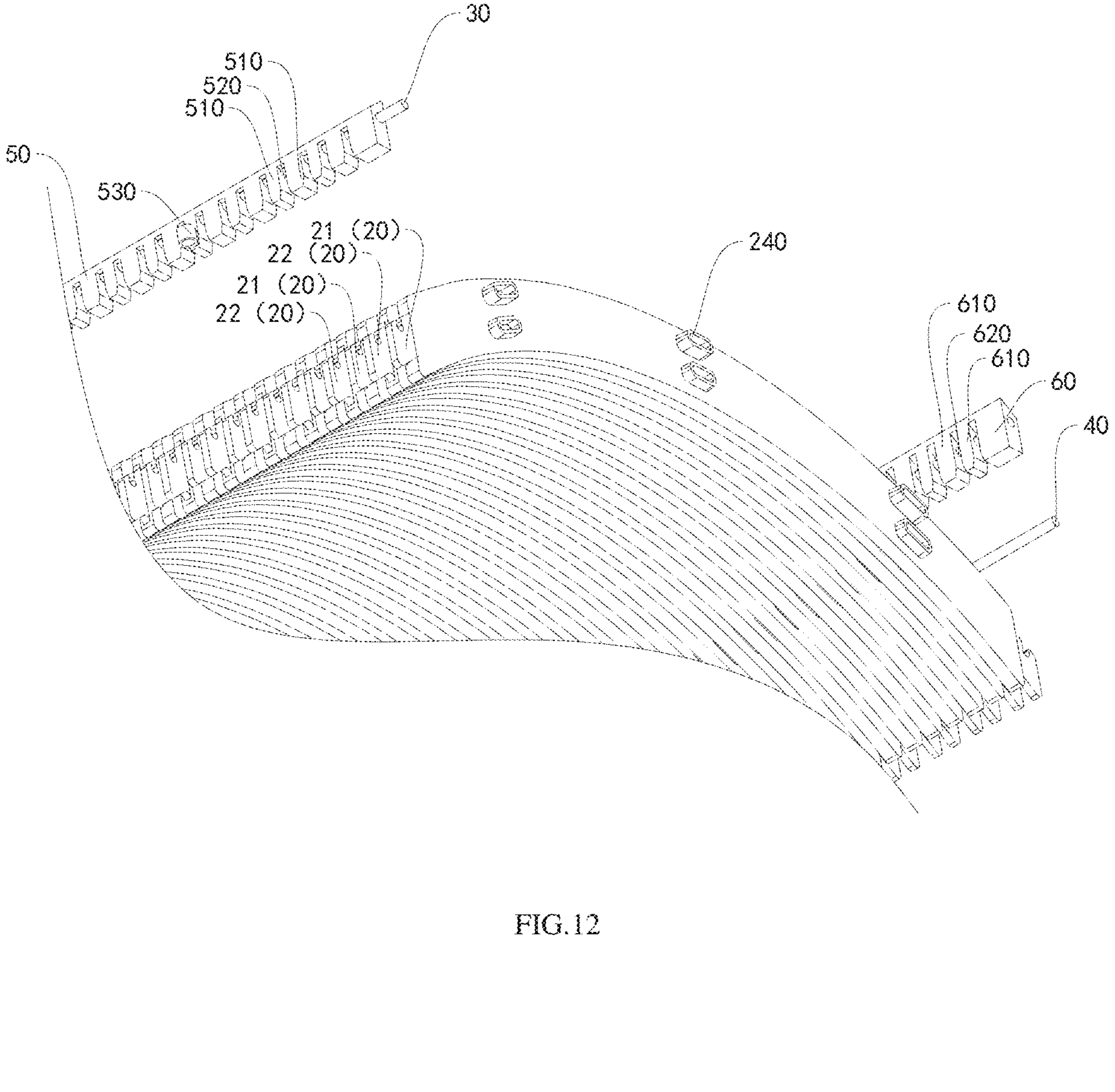
FIG. 12 is a schematic diagram showing connections among a plurality of electrode units and first and second positioning elements of an electrostatic dust removal apparatus according to yet another embodiment of the present disclosure.
Figure 13:
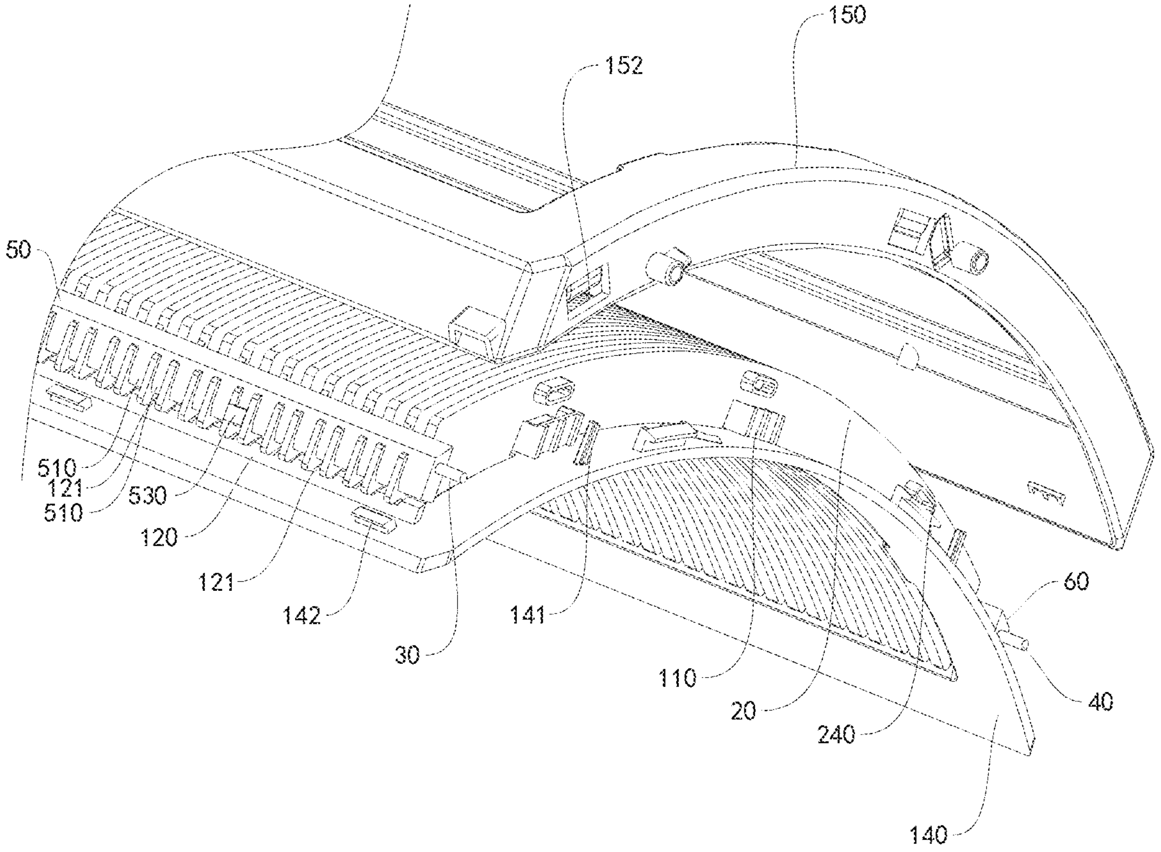
FIG. 13 is a schematic diagram showing the connection between a plurality of electrode units and the bottom frame in an electrostatic dust removal apparatus according to yet another embodiment of the present disclosure.
Figure 14:
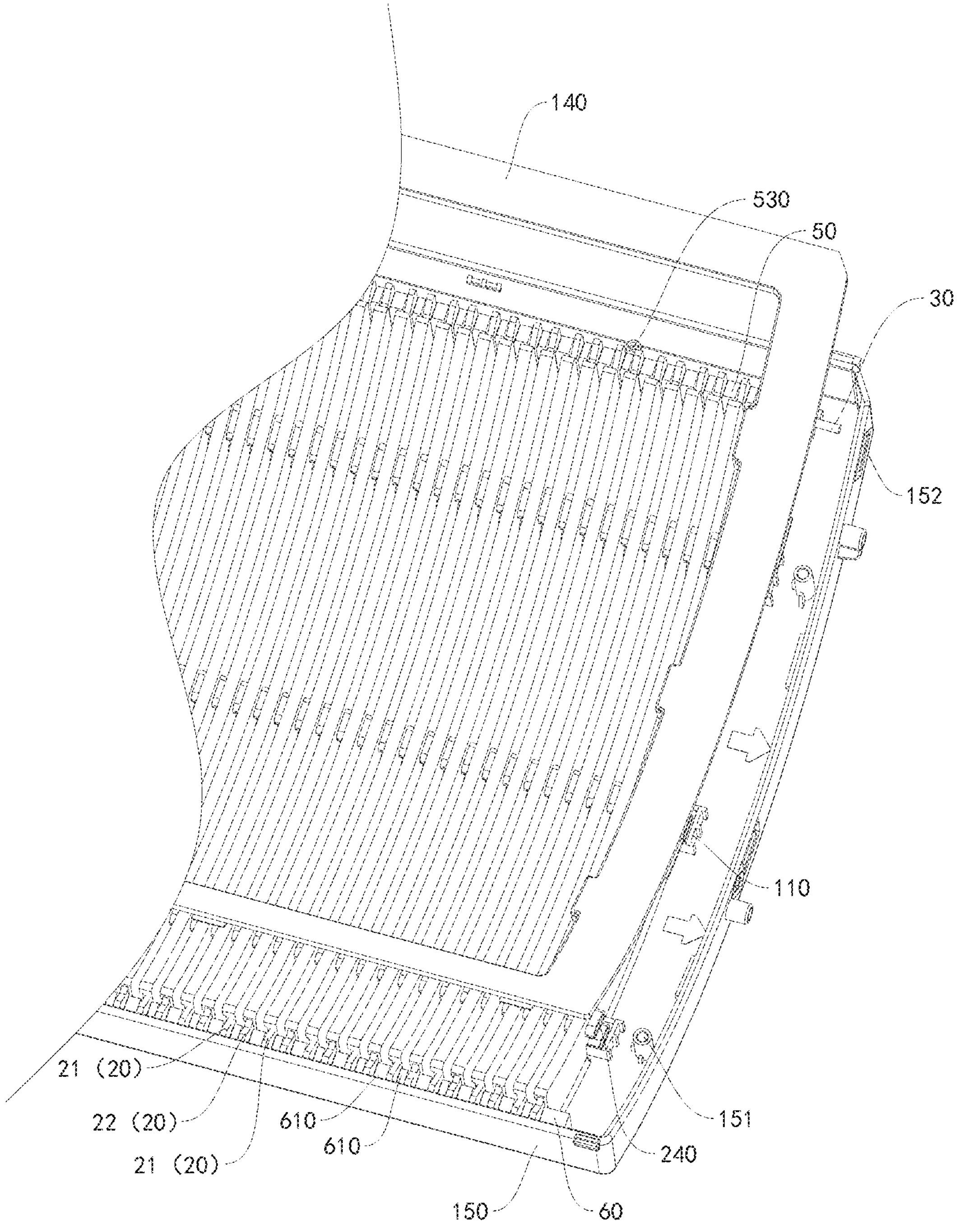
FIG. 14 is a schematic diagram showing the connection between a plurality of electrode units and the main frame in an electrostatic dust removal apparatus according to yet another embodiment of the present disclosure.
Figure 16:
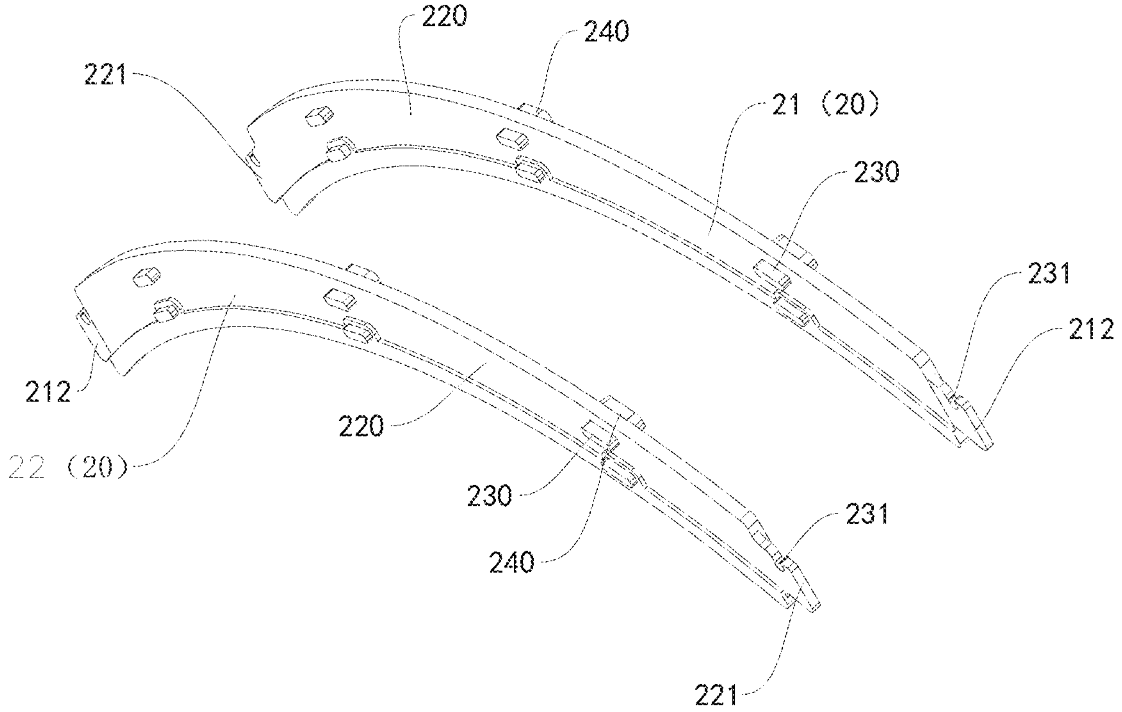
FIG. 16 is a schematic diagram showing a structure of one side of an electrode unit in an electrostatic dust removal apparatus according to another embodiment of the present disclosure.
Figure 17:
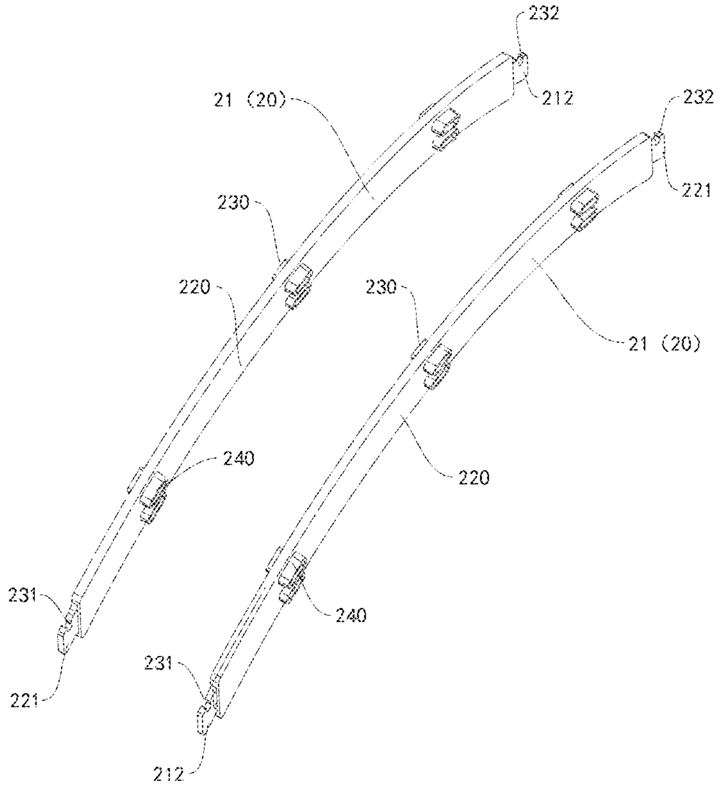
FIG. 17 is a schematic diagram showing a structure of an opposite side of the electrode unit of an electrostatic dust removal apparatus according to another embodiment of the present disclosure.
Figure 18:
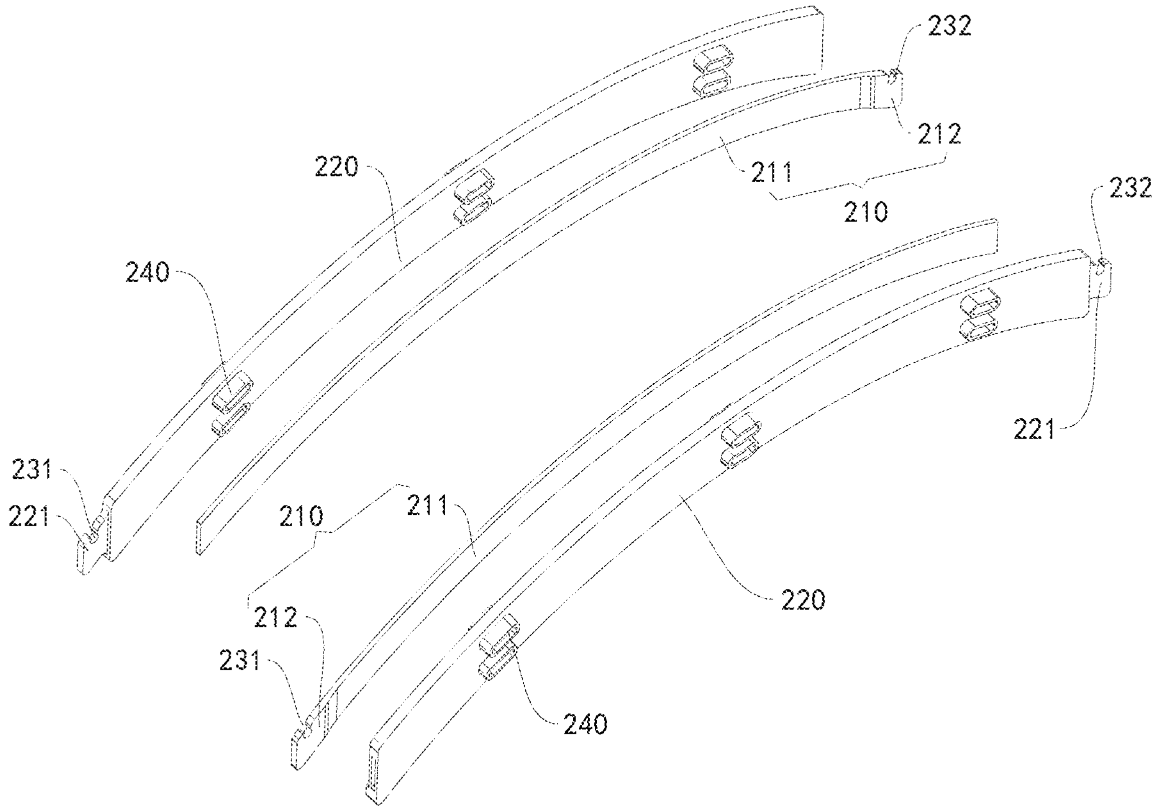
FIG. 18 is an exploded view of an electrode unit of an electrostatic dust removal apparatus according to another embodiment of the present disclosure.

Further, as illustrated in FIG. 7 to FIG. 9 and in FIG. 16 to FIG. 18, one end of the high-potential unit 21 is the conducting end 212 formed by the conducting part 210 of the high-potential unit 21, and the other end of the high-potential unit 21 is the insulating end 221 formed by the insulating part 220 of the high-potential unit 21. One end of the low-potential unit 22 is the conducting end 212 formed by the conducting part 210 of the low-potential unit 22, and the other end of the low-potential unit 22 is the insulating end 221 formed by the insulating part 220 of the low-potential unit 22.

Here, the conducting ends 212 of the plurality of high-potential units 21 and the insulating ends 221 of the plurality of low-potential units 22 face one side of the frame 10, and the insulating ends 221 of the plurality of high-potential units 21 and the conducting ends 212 of the plurality of low-potential units 22 face an opposite side of the frame 10.

Further, as illustrated in FIG. 1 to FIG. 4 and FIG. 10 to FIG. 13, the high-potential conductor 30 is provided at the one side of the frame 10 and is connected to the conducting end 212 of each of the plurality of high-potential units 21 and the insulating end 221 of each of the plurality of low-potential units 22; and the low-potential conductor 40 is provided at the opposite side of the frame 10 and is connected to the conducting end 212 of each of the plurality of low-potential units 22 and the insulating end 221 of each of plurality of the high-potential units 21.

Therefore, the high-potential conductor 30 and the low-potential conductor 40 are provided on two opposite sides of the frame 10 respectively, e.g., the two opposite sides of the frame 10 in the width direction of the frame 10. In this way, the high-potential conductor 30 and the low-potential conductor 40 can be separated from each other in space to avoid problems such as contact and short circuit between the high-potential conductor 30 and the low-potential conductor 40, so as to guarantee the reliability of the electrical field. Further, the provision of the high-potential conductor 30 and the low-potential conductor 40 may further fix the relative positions of the ends of the plurality of electrode units 20.

In some specific embodiments of the present disclosure, as illustrated in FIG. 1 to FIG. 4 and FIG. 10 to FIG. 13, the electrostatic dust removal apparatus 1 may further include a first positioning element 50 and a second positioning element 60. The high-potential conductor 30 is provided on the first positioning element 50, and the first positioning element 50 fits to the conducting end 212 of each of the plurality of high-potential units 21 and the insulating end 221 of each of the plurality of low-potential units 22. The low-potential conductor 40 is provided on the second positioning element 60, and the second positioning element 60 fits to the conducting end 212 of each of the plurality of low-potential units 22 and the insulating end 221 of each of the plurality of high-potential units 21. Thus, the provision of the first positioning element 50 and the second positioning element 60 may fix the high-potential conductor 30 and the low-potential conductor 40 respectively and connect to the plurality of electrode units 20.

In particular, as illustrated in FIG. 2 to FIG. 4 and FIG. 11 to FIG. 13, the first positioning element 50 is provided with a plurality of first positioning teeth 510, and each of a plurality of first tooth spaces 520 is formed between the first positioning teeth 510 adjacent to each other. The high-potential conductor 30 extends through the first positioning element 50 along the length direction of the first positioning element 50 and is exposed from the plurality of tooth spaces 520. Each of the plurality of first positioning teeth 510 is fitted between the conducting end 212 of one high-potential unit 21 and the insulating end 221 of the low-potential unit 22 adjacent to the high-potential unit 21. The second positioning element 60 is provided with a plurality of second positioning teeth 610, and each of a plurality of second tooth spaces 620 is formed between the second positioning teeth 610 adjacent to each other. The low-potential conductor 40 extends through the second positioning element 60 along the length direction of the second positioning element 60 and is exposed from the plurality of second tooth spaces 620. Each of the plurality of second positioning teeth 610 is fitted between the conducting end 212 of one low-potential unit 22 and the insulating end 221 of the high-potential unit 21 adjacent to the low-potential unit 22.

More particularly, the plurality of first positioning teeth 510 may have the same width or different widths, and the plurality of second positioning teeth 610 may have the same width or different widths. The width of each of the plurality of first positioning teeth 510 may be set based on the spacing between the conducting end 212 of the corresponding high-potential unit 21 and the insulating end 221 of the corresponding low-potential unit 22, and the width of each of the plurality of second positioning teeth 610 may be set based on the spacing between the conducting end 212 of the corresponding low-potential unit 22 and the insulating end 221 of the corresponding high-potential unit 21. The width of the tooth top of each of the first positioning tooth 510 and the second positioning tooth 610 can be gradually decreased for convenience of assembly. Thus, the first positioning element 50 and the second positioning element 60 provided with the high-potential conductor 30 and the low-potential conductor 40 respectively thereon, can be assembled with the plurality of electrode units 20, improving the structural stability of the plurality of electrode units 20 and the reliability of the electrical connection.

In some specific embodiments of the present disclosure, as illustrated in FIG. 3, FIG. 5, FIG. 12 and FIG. 14, for the purpose of further improving the stability of the first positioning element 50 and the second positioning element 60 in the frame, the first positioning element 50 is provided with a plurality of first studs 530 spaced apart from each other along its length direction, and the plurality of first studs 530 are mounted onto the frame 10 by a plurality of first screw fasteners (such as screw bolts or screw nails) respectively. The second positioning element 60 is provided with a plurality of second studs 630 spaced apart from each other along its length direction, and the plurality of second studs 630 are mounted onto the frame 10 by a plurality of second screw fasteners (such as screw bolts or screw nails) respectively.

In some specific embodiments of the present disclosure, as illustrated in FIG. 5, FIG. 6, FIG. 13 and FIG. 14, the frame 10 is provided with a plurality of first ribs 550 which are spaced apart from each other and surround the first positioning element 50, and is provided with a plurality of second ribs (not shown in the drawings) which are spaced apart from each other and surround the second positioning element 60. The plurality of first ribs 550 may include a first linear rib 551 and two first corner ribs 552, the first linear rib 551 extends along the length direction of the first positioning element 50 and can press against the inner side of the first positioning element 50, and the two first corner ribs 552 can press against two corners at the outer side of the first positioning element 50 respectively. The plurality of second ribs include a second linear rib and two second corner ribs, the second linear rib extends along the length direction of the second positioning element 60 and can press against the inner side of the second positioning element 60, and the two corner ribs can press against two corners at the outer side of the second positioning element 60 respectively. Thus, the first positioning element 50 and the second positioning element 60 can be stably fixed onto the frame 10, realizing a convenient connection and a simplified and reasonable structure.

It may be understood by a person skilled in the art that, each of the first corner rib 552 and the second corner rib may have a different specific structure in a different embodiment. For example, in the embodiment shown in FIG. 6, the first corner rib 552 and the second corner rib each may be a U-shaped structure; however, in the embodiment shown in FIG. 15, the first corner rib 552 and the second corner rib each may be an L-shaped structure.

In some specific embodiments of the present disclosure, as illustrated in FIG. 6 and FIG. 15, the one side of the frame 10 described above is provided with a first fixing element 120, and the opposite side of the frame 10 described above is provided with a second fixing element 130. The first fixing element 120 is provided with a plurality of first fixing grooves 121 spaced apart from each other along its length direction, and the conducting ends 212 of the plurality of high-potential units 21 and the insulating ends 221 of the plurality of low-potential units 22 are fitted into the plurality of first fixing grooves 121 respectively. The second fixing element 130 is provided with a plurality of second fixing grooves 131 spaced apart from each other along its length direction, and the conducting ends 212 of the plurality of low-potential units 22 and the insulating ends 221 of the plurality of high-potential units 21 are fitted into the plurality of second fixing grooves 131 respectively. Thus, the plurality of electrode units 20 can be fixed onto the frame 10, and the stability of the plurality of electrode units 20 and the uniformity of the spacings among the plurality of electrode units 20 can be guaranteed. For convenience of assembly, the first fixing groove 121 has a width gradually increasing from its bottom to its opening, and the second fixing groove 131 has a width gradually increasing from its bottom to its opening.

In some specific examples of the present disclosure, the frame 10 is configured as a rectangle-shape which surrounds the plurality of electrode units 20. The electrostatic dust removal apparatus 1 can be bent into an arc shape about an axis L. The axis L extends along the length direction of the frame 10 and is located at the middle of the frame 10 in the width direction of the frame 10. Thus, the installation space can be saved and the area of the region in contact with air can be increased, therefore the efficiency for dust removal can be improved. Here, each of the plurality of electrode units 20 extends along the width direction of the frame 10, the plurality of electrode units 20 are provided spaced apart from each other along the length direction of the frame 10, and the two ends of each of the plurality of electrode units 20 are detachably mounted onto two opposite sides of the frame 10 in the width direction respectively. Of course, in the present disclosure, the overall shape of the electrostatic dust removal apparatus 1 is not limited to any particular shape, and the electrostatic dust removal apparatus 1 can be configured as any suitable shape according to a practical application environment.

In some specific embodiments of the present disclosure, as illustrated in FIG. 2, FIG. 4 to FIG. 6, FIG. 11 and FIG. 13 to FIG. 15, the frame 10 includes a main frame 150 and a bottom frame 140. The bottom frame 140 is detachably mounted onto the main frame 150, and an installation space is defined between the bottom frame 140 and the main frame 150. Both ends of each of the plurality of electrode units 20, the first positioning element 50, the second positioning element 60, the high-potential conductor 30, the low-potential conductor 40, the first fixing element 120 and the second fixing element 130 may be provided in the installation space. By the above configuration, the frame 10 can provide shelter and protection for these structures, allow the appearance of the electrostatic dust removal apparatus 1 more pleasant, and facilitate assembly and disassembly of the overall structure.

In particular, an end positioning structure 110 is formed on both of the main frame 150 and the bottom frame 140, that is, a complete end positioning structure 110 can be formed when the main frame 150 and the bottom frame 140 are in a snap-fit connection. The main frame 150 is configured with the first rib 550 and the second rib, the bottom frame 140 is configured with the first fixing element 120 and the second fixing element 130, and the first positioning element 50 and the second positioning element 60 are mounted on the main frame 150. In particular, as illustrated in FIG. 6 and FIG. 15, one of the main frame 150 and the bottom frame 140 is provided with a male snap 142 and the other of the main frame 150 and the bottom frame 140 is provided with a female snap 152, and the male snap 142 can be snapped onto the female snap 152. For example, a plurality of female snaps 152 may be provided on the main frame 150 and are arranged spaced apart from each other along the circumferential direction of the main frame 150, a plurality of male snaps 142 may be provided on the bottom frame 140 and are arranged spaced apart from each other along the circumferential direction of the bottom frame 140, and the plurality of male snaps 142 can be snapped into the plurality of female snaps 152 in one-to-one correspondence.

Further, one of the main frame 150 and the bottom frame 140 is provided with a position-limiting pin 141 and the other of the main frame 150 and the bottom frame 140 is provided with a position-limiting sleeve 151, and the position-limiting pin 141 is configured to be inserted into the position-limiting sleeve 151. For example, a plurality of position-limiting pins 141 are arranged on each of two opposite sides of the bottom frame 140 in the length direction of the bottom frame 140 and are spaced apart from each other, a plurality of position-limiting sleeves 151 are arranged on each of two opposite sides of the main frame 150 in the length direction of the main frame 150 and are spaced apart from each other, and the plurality of position-limiting pins 141 can be inserted into the plurality of position-limiting sleeves 151 in one-to-one correspondence.

The provision of the position-limiting pin 141 and the position-limiting sleeve 151 may facilitate quick determination of the relative mounting positions of the main frame 150 and the bottom frame 140, that is, may enable pre-positioning, therefore saving time and energy for mounting. The male snap 142 and the female snap 152 can make the installation of the main frame 150 and the bottom frame 140 more firm and stable and make the assembly and disassembly of the main frame 150 and the bottom frame 140 more convenient.

An electrode unit 20 of an electrostatic dust removal apparatus according to embodiments of the present disclosure will be illustrated below with reference to the drawings. As illustrated in FIG. 7 to FIG. 9, FIG. 16 and FIG. 18, the electrode unit 20 of the electrostatic dust removal apparatus according to embodiments of the present disclosure includes a conducting part 210 and an insulating part 220. The conducting part 210 is a conductive plastic part and includes an electrical field generator 211 and a conducting end 212. The insulating part 220 covers at least a portion of the electrical field generator 211.

The electrode unit 20 of the electrostatic dust removal apparatus according to embodiments of the present disclosure has advantages such as lower manufacture cost, easiness to form various structures, high security and convenience for assembly.

In the description of the present disclosure, the description with reference to the terms "one embodiment", "some embodiments", "exemplary embodiments", "example", "specific example", or "some examples", etc., means that specific features, structures, materials, or characteristics described in conjunction with the embodiment(s) or example(s) are included in at least one embodiment or example of the present disclosure. In the present disclosure, any illustrative reference to the above terms does not necessarily refer to the same embodiment(s) or example(s). In addition, specific characteristics, structures, materials or features described may be combined in any one or more embodiments or examples in a suitable manner.

Although the embodiments of the present disclosure have been shown and described above, it can be appreciated by those of ordinary skill in the art that various changes, modifications, alternatives and variants can be made to the above embodiments without departing from the principle and the spirit of the present disclosure. The scope of the disclosure is defined by claims and equivalents thereof.

What is claimed is:

1. An electrostatic dust removal apparatus, comprising:

a frame; and a plurality of electrode units comprising a plurality of high-potential units and a plurality of low-potential units, the plurality of electrode units being provided on the frame and being spaced apart from each other, the plurality of high-potential units and the plurality of low-potential units being arranged alternately, and an air channel for removing dust being formed between the electrode units adjacent to each other;

wherein each of the plurality of electrode units comprises a conducting part and an insulating part, the conducting part is a conductive plastic part and comprises an electrical field generator and a conducting end, and the insulating part covers at least a portion of the electrical field generator; and the electrostatic dust removal apparatus further comprises:

a high-potential conductor disposed on one side of the frame in an extending direction of the electrode unit and connected to the conducting end of each of the plurality of high-potential units; and a low-potential conductor disposed on another side of the frame that is opposite to the one side of the frame and connected to the conducting end of each of the plurality of low-potential units, and both of the high-potential conductor and the low-potential conductor extending along a direction along which the plurality of high-potential units and the plurality of low-potential units are arranged alternately.

2. The electrostatic dust removal apparatus according to claim 1, wherein the insulating part covers the whole electrical field generator; or the electrical field generators adjacent to each other have surfaces facing each other, one of the surfaces is covered by the insulating part, and the other of the surfaces is exposed from the insulating part.

3. The electrostatic dust removal apparatus according to claim 1, wherein the conducting part and the insulating part of each of the plurality of electrode units are formed integrally by injection molding.

4. The electrostatic dust removal apparatus according to claim 1, wherein the conductive plastic has a tensile strength in the range of 20 MPa to 28 MPa, the conductive plastic has an ultimate elongation of not less than 10%, the conductive plastic has a flexural strength in the range of 32 MPa to 40 MPa, the conductive plastic has a flexural modulus in the range of 3000 MPa to 3800 MPa, and the conductive plastic has a notched impact strength in the range of 100J/m to 140J/m; and/or the conductive plastic has a surface resistivity of $10^3$ Ohm-cm; and/or the conductive plastic has a specific weight in the range of 0.92 g/cm$^3$ to 1.12 g/cm$^3$, the conductive plastic has a flammability in HB class, the conductive plastic has a shrinkage in the range of 0.4% to 0.8% and the conductive plastic has a heat deformation temperature in the range of 95° C. to 115° C.

5. The electrostatic dust removal apparatus according to claim 1, wherein the plurality of electrode units are arranged along a thickness direction of the plurality of electrode units, and two ends of each of the plurality of electrode units are detachably mounted onto two opposite sides of the frame respectively.

6. The electrostatic dust removal apparatus according to claim 1, wherein one of the electrode units adjacent to each other is provided with a positioning ring, and the other of the electrode units adjacent to each other is provided with a positioning protrusion configured to be inserted into the positioning ring.

7. The electrostatic dust removal apparatus according to claim 6, wherein an end positioning structure is provided on the frame, and the positioning ring or the positioning protrusion of the outermost electrode unit fits to the end positioning structure.

8. The electrostatic dust removal apparatus according to claim 1, wherein one end of the high-potential unit is the conducting end formed by the conducting part of the high-potential unit, and the other end of the high-potential unit is an insulating end formed by the insulating part of the high-potential unit, and one end of the low-potential unit is the conducting end formed by the conducting part of the low-potential unit, and the other end of the low-potential unit is an insulating end formed by the insulating part of the low-potential unit, wherein the conducting ends of the plurality of high-potential units and the insulating ends of the plurality of low-potential units face one side of the frame, and the insulating ends of the plurality of high-potential units and the conducting ends of the plurality of low-potential units face an opposite side of the frame.

9. The electrostatic dust removal apparatus according to claim 8, wherein the high-potential conductor is provided at the one side of the frame and is connected to the insulating end of each of the plurality of low-potential units; and the low-potential conductor is provided at the opposite side of the frame and is connected to the insulating end of each of the plurality of high-potential units.

10. The electrostatic dust removal apparatus according to claim 9, wherein the electrostatic dust removal apparatus further comprises:

a first positioning element, the high-potential conductor being provided on the first positioning element, and the first positioning element fitting to the conducting end of each of the plurality of high-potential units and the insulating end of each of the plurality of low-potential units; and a second positioning element, the low-potential conductor being provided on the second positioning element, and the second positioning element fitting to the conducting end of each of the plurality of low-potential units and the insulating end of each of the plurality of high-potential units.

11. The electrostatic dust removal apparatus according to claim 10, wherein the first positioning element is provided with a plurality of first positioning teeth, each of a plurality of first tooth spaces is formed between the first positioning teeth adjacent to each other, the high-potential conductor extends through the first positioning element and is exposed from the plurality of first tooth spaces, and each of the plurality of first positioning teeth is fitted between the conducting end of one high-potential unit and the insulating end of the low-potential unit adjacent to the one high-potential unit; and the second positioning element is provided with a plurality of second positioning teeth, each of a plurality of second tooth spaces is formed between the second positioning teeth adjacent to each other, the low-potential conductor extends through the second positioning element and is exposed from the plurality of second tooth spaces, and each of the plurality of second positioning teeth is fitted between the conducting end of one low-potential unit and the insulating end of the high-potential unit adjacent to the one low-potential unit.

12. The electrostatic dust removal apparatus according to claim 11, wherein the conducting end of each of the plurality of high-potential units and the insulating end of each of the plurality of low-potential units are provided with a first positioning groove respectively, and the first positioning element is fitted into a plurality of first positioning grooves, and the conducting end of each of the plurality of low-potential units and the insulating end of each of the plurality of high-potential units are provided with a second positioning groove respectively, and the second positioning element is fitted into a plurality of second positioning grooves.

13. The electrostatic dust removal apparatus according to claim 10, wherein the first positioning element is provided with a plurality of first studs spaced apart from each other along its length direction, and the plurality of first studs are mounted on the frame by a plurality of first screw fasteners respectively; and the second positioning element is provided with a plurality of second studs spaced apart from each other along its length direction, and the plurality of second studs are mounted on the frame by a plurality of second screw fasteners respectively.

14. The electrostatic dust removal apparatus according to claim 10, wherein the frame is provided with a plurality of first ribs which are spaced apart from each other and surround the first positioning element, and is provided with a plurality of second ribs which are spaced apart from each other and surround the second positioning element.

15. The electrostatic dust removal apparatus according to claim 1, wherein the frame is configured as a rectangle shape which surrounds the plurality of electrode units; and each of the plurality of electrode units extends along a width direction of the frame, the plurality of electrode units are provided spaced apart from each other along a length direction of the frame, and two ends of each of the plurality of electrode units are detachably mounted onto two opposite sides of the frame in the width direction respectively.

16. The electrostatic dust removal apparatus according to claim 15, wherein the electrostatic dust removal apparatus is bent into an arc shape about an axis, the axis extends along the length direction of the frame and is located at the middle of the frame in the width direction of the frame.

17. The electrostatic dust removal apparatus according to claim 1, wherein the frame comprises:

a main frame; and a bottom frame detachably mounted onto the main frame, an installation space being defined between the bottom frame and the main frame, and both ends of each of the plurality of electrode units being provided in the installation space.

18. The electrostatic dust removal apparatus according to claim 17, wherein one of the main frame and the bottom frame is provided with a male snap and the other of the main frame and the bottom frame is provided with a female snap, and the male snap is configured to be snapped onto the female snap; or one of the main frame and the bottom frame is provided with a position-limiting pin and the other of the main frame and the bottom frame is provided with a position-limiting sleeve, and the position-limiting pin is configured to be inserted into the position-limiting sleeve.

* * * * *